US011136811B2

(12) United States Patent
Scheuring et al.

(10) Patent No.: US 11,136,811 B2
(45) Date of Patent: Oct. 5, 2021

(54) CONNECTION MECHANISM FOR THIN WALL TUBE

(71) Applicant: Magna Closures Inc., Newmarket (CA)

(72) Inventors: Joseph Scheuring, Richmond Hill (CA); Wieslaw Nowicki, Mississauga (CA); Gerard McMahon, Aurora (CA)

(*) Notice: Subject to any disclaimer, the term of this patent is extended or adjusted under 35 U.S.C. 154(b) by 175 days.

(21) Appl. No.: 16/387,177

(22) Filed: Apr. 17, 2019

(65) Prior Publication Data
US 2020/0024883 A1 Jan. 23, 2020

Related U.S. Application Data

(60) Provisional application No. 62/660,522, filed on Apr. 20, 2018.

(51) Int. Cl.
*E05F 15/622* (2015.01)
*F16H 25/20* (2006.01)
*B60J 5/10* (2006.01)

(52) U.S. Cl.
CPC ........... *E05F 15/622* (2015.01); *F16H 25/20* (2013.01); *B60J 5/101* (2013.01); *E05Y 2600/502* (2013.01); *E05Y 2600/506* (2013.01); *E05Y 2900/546* (2013.01); *F16H 2025/2037* (2013.01); *F16H 2025/2075* (2013.01)

(58) Field of Classification Search
CPC .................... E05F 15/622; F16H 25/20; F16H 2025/2037; F16H 2025/2075; B60J 5/101; E05Y 2600/502; E05Y 2600/506; E05Y 2600/50; E05Y 2900/546; Y10T 29/49918

USPC ........................................ 188/322.16, 322.19
See application file for complete search history.

(56) References Cited

U.S. PATENT DOCUMENTS

| | | | | |
|---|---|---|---|---|
| 3,326,006 A | * | 6/1967 | Mount Wadsworth | ...................... E02D 5/665 405/251 |
| 3,958,673 A | * | 5/1976 | Allinquant | ............. B60G 13/08 188/322.14 |
| 4,480,730 A | * | 11/1984 | Koller | ..................... F16F 9/364 188/315 |

(Continued)

FOREIGN PATENT DOCUMENTS

| CA | 1319722 | 6/1993 |
|---|---|---|
| GB | 1306733 | 2/1973 |

*Primary Examiner* — Xuan Lan Nguyen

(57) ABSTRACT

A method for constructing an extension mechanism for a closure panel of a vehicle, the extension mechanism including an extension member housed in a body housing, such that the extension member extends and retracts with respect to the body housing as the closure panel is opened and closed, the extension mechanism having a first connection at one end for connecting the extension member to the vehicle and a second connection at the other end for connecting the body housing to the vehicle, the method comprising the steps of: overlapping a tube wall of the body housing with an end portion of the body housing, the end portion having a receiving indentation; receiving a deformed portion of the tube wall into the receiving indentation in order to form a crimp connection between the tube wall and the end portion; and positioning a clamping member having a body by at least a portion of the body over the tube wall, such that the deformed portion is sandwiched between the portion of the body and the receiving indentation.

14 Claims, 20 Drawing Sheets

(56) References Cited

U.S. PATENT DOCUMENTS

| | | | | |
|---|---|---|---|---|
| 4,783,897 A | * | 11/1988 | Basnett | B21D 39/04 |
| | | | | 285/382 |
| 5,014,601 A | * | 5/1991 | Sundholm | F15B 15/1438 |
| | | | | 92/109 |
| 5,121,625 A | | 6/1992 | Unewisse et al. | |
| 5,579,876 A | * | 12/1996 | Adrian | F16F 9/36 |
| | | | | 188/322.17 |
| 5,620,172 A | * | 4/1997 | Fulks | B60G 13/006 |
| | | | | 267/179 |
| 7,566,092 B2 | | 7/2009 | Paton et al. | |
| 7,810,620 B2 | * | 10/2010 | Nishimura | F16F 9/54 |
| | | | | 188/322.19 |
| 7,938,473 B2 | | 5/2011 | Paton et al. | |
| 9,283,612 B2 | * | 3/2016 | Trojer | B21D 39/031 |
| 9,976,332 B2 | | 5/2018 | Scheuring et al. | |
| 10,100,568 B2 | * | 10/2018 | Scheuring | B60J 5/106 |
| 2006/0219506 A1 | * | 10/2006 | Zdeb | F16F 7/09 |
| | | | | 188/322.16 |
| 2014/0137477 A1 | * | 5/2014 | Ooe | E05F 1/1091 |
| | | | | 49/358 |

* cited by examiner

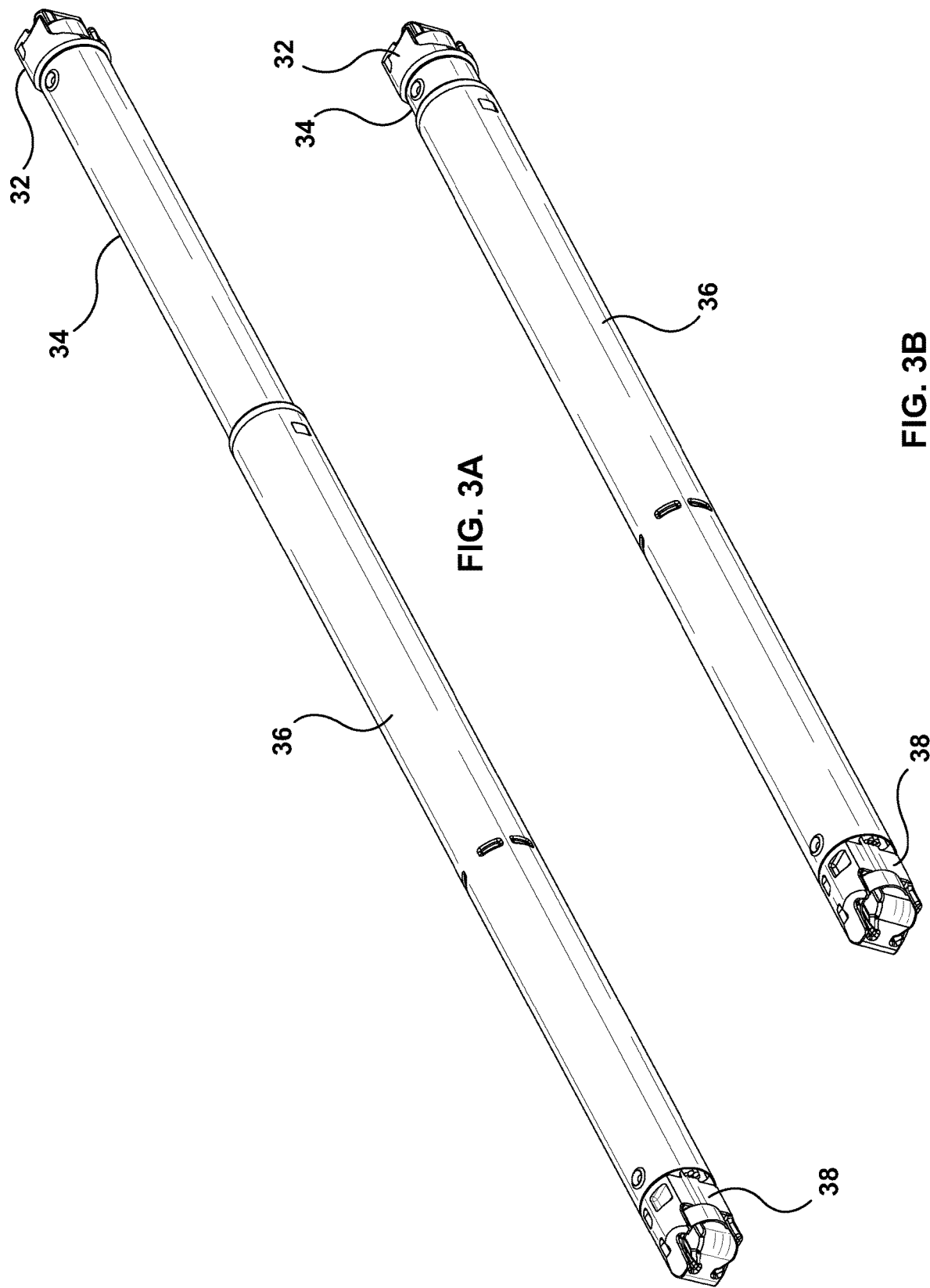

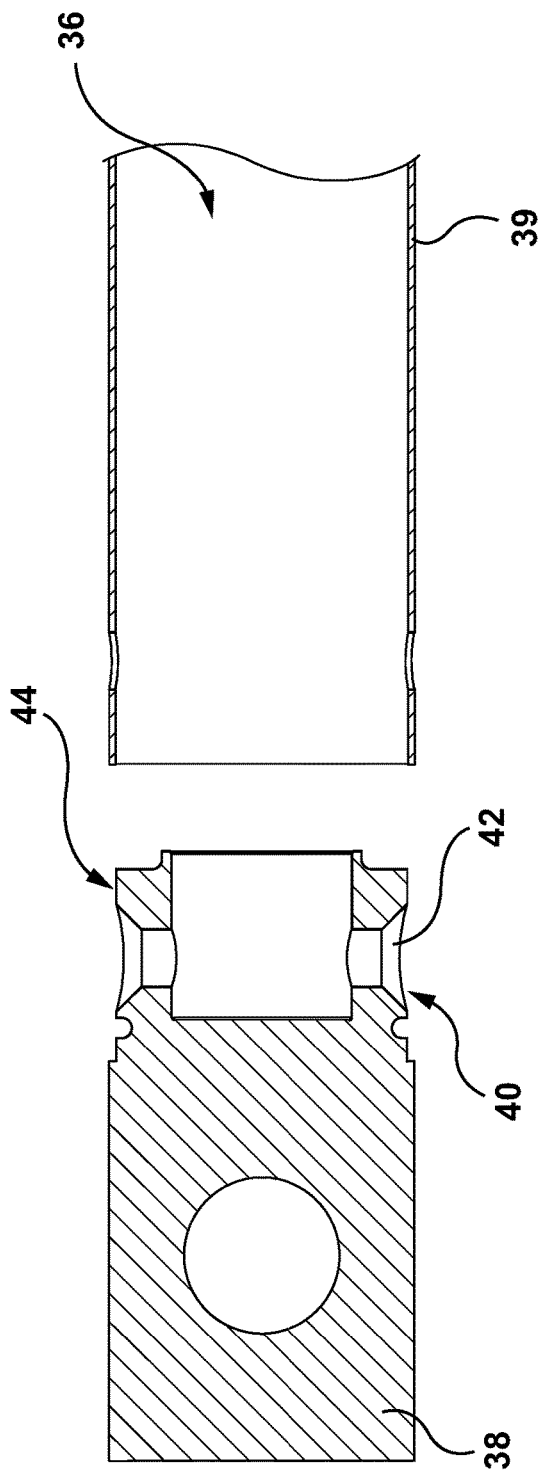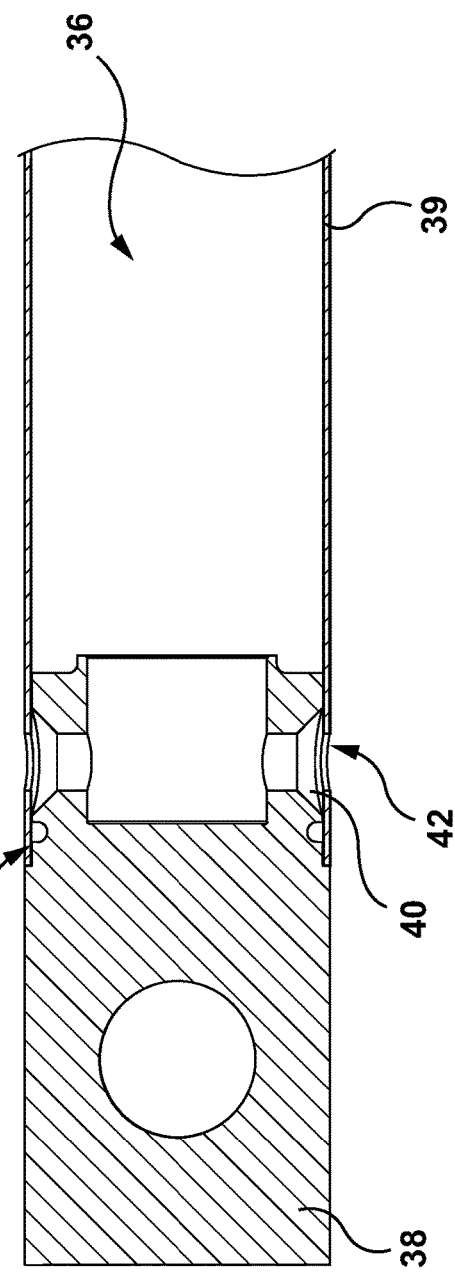

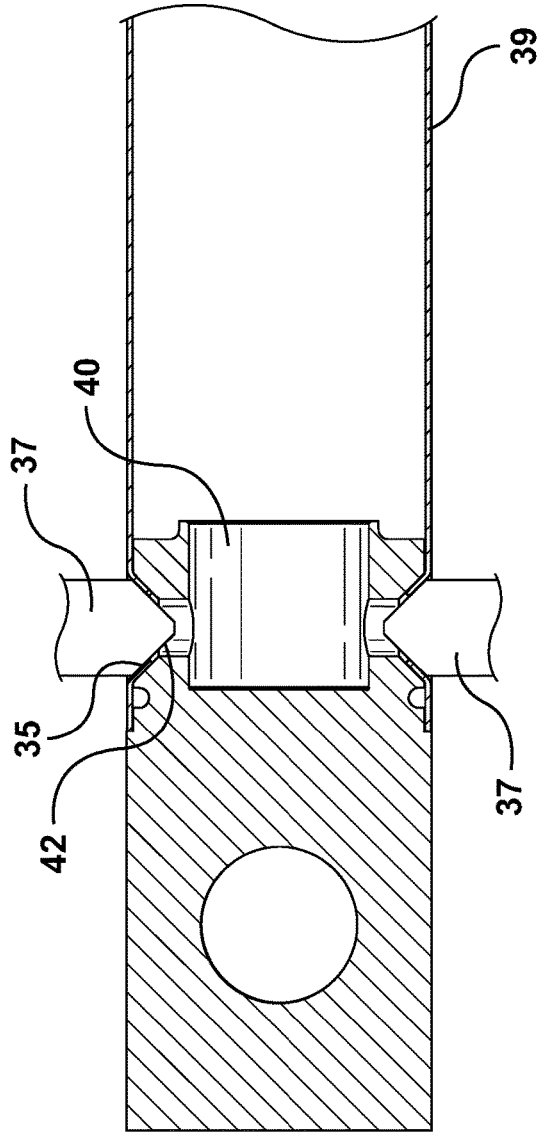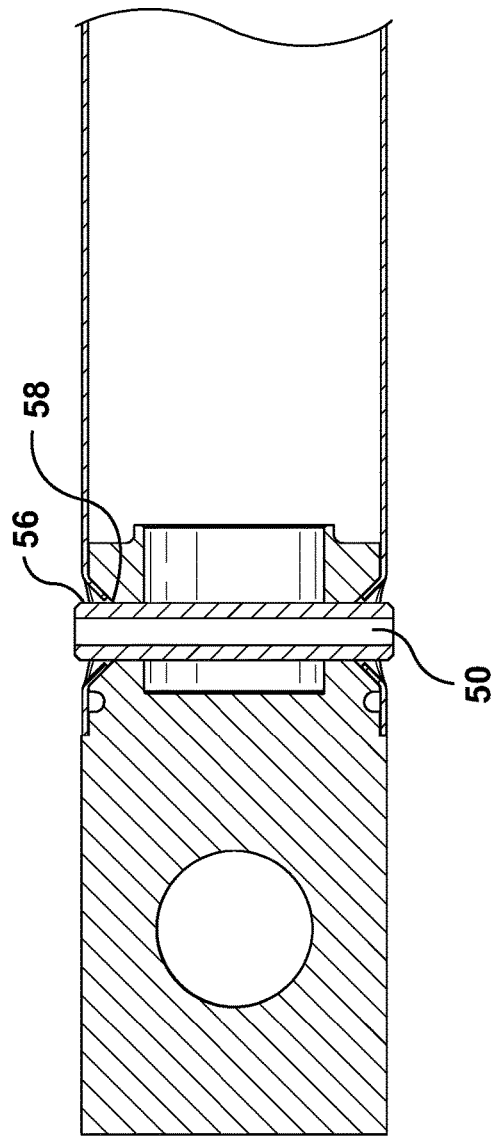

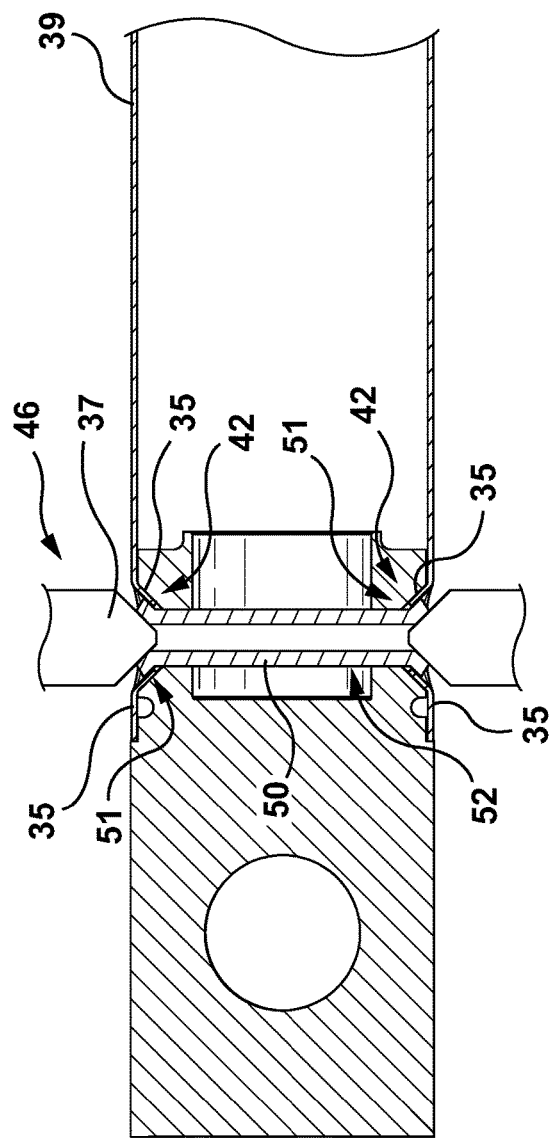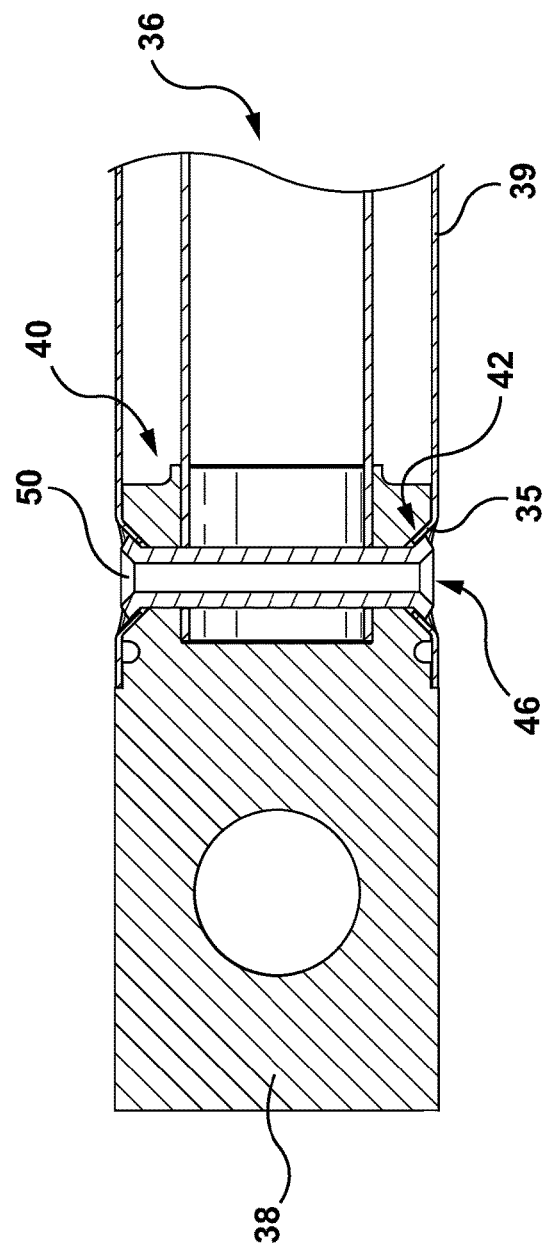

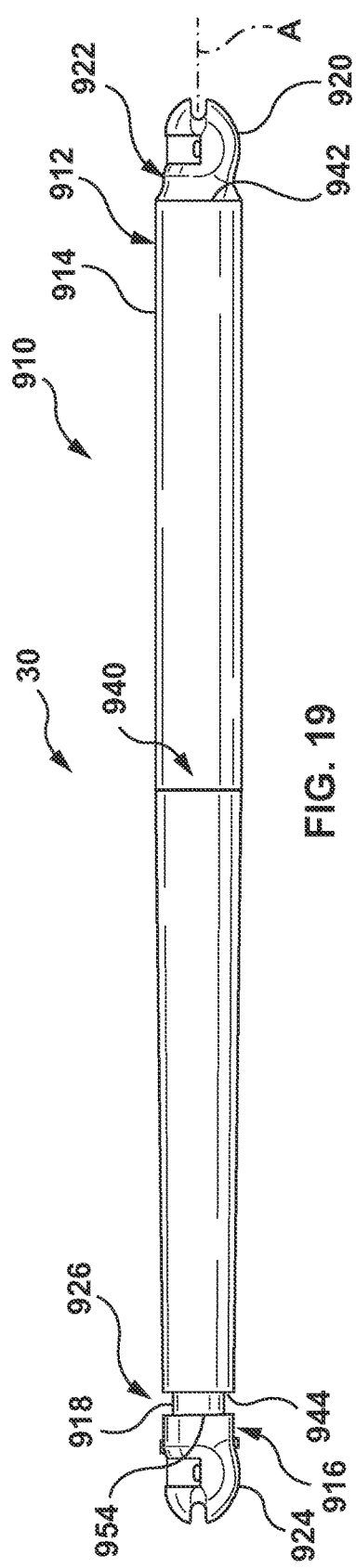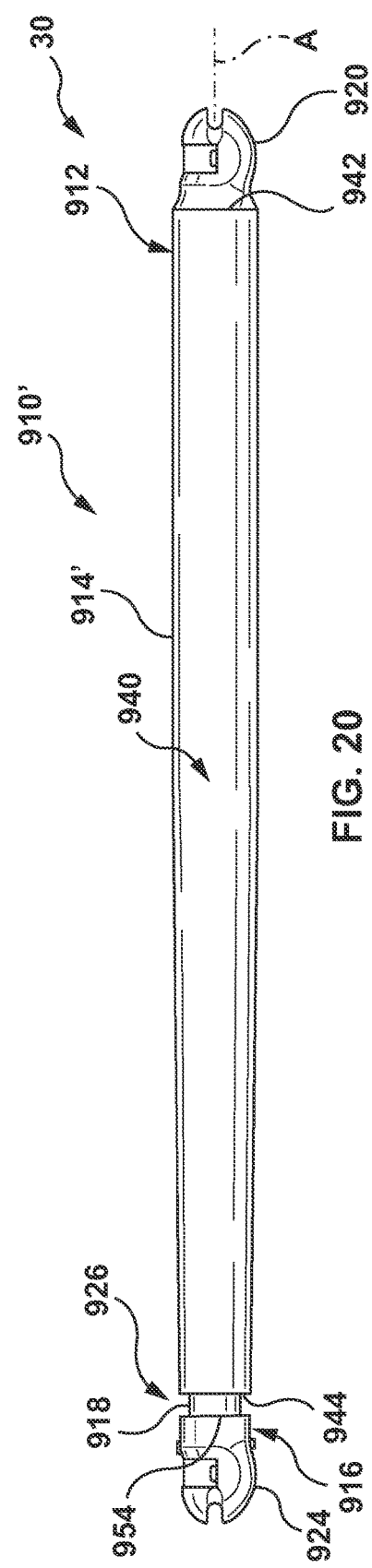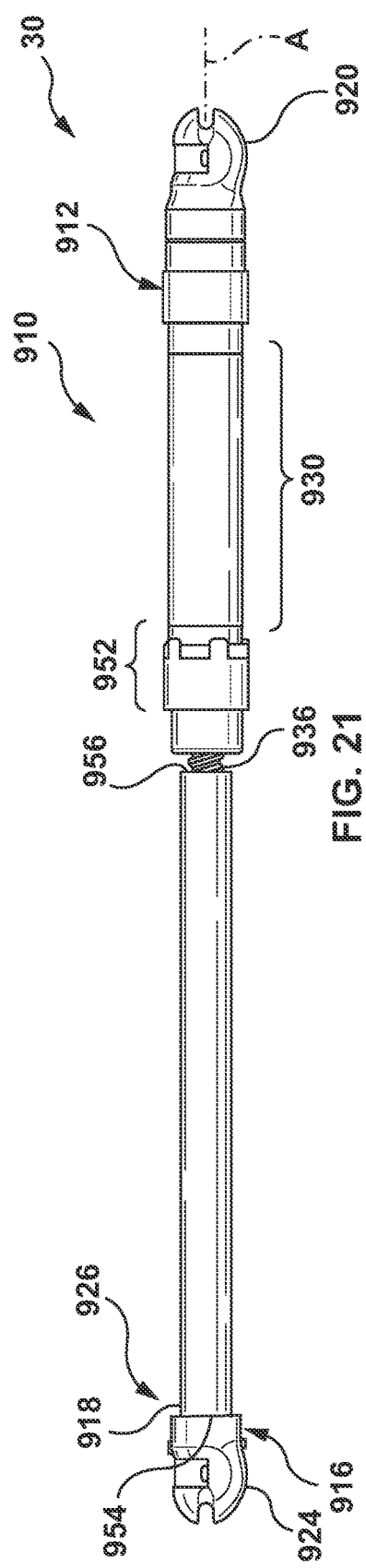

US 11,136,811 B2

CONNECTION MECHANISM FOR THIN WALL TUBE

CROSS-REFERENCE TO RELATED APPLICATIONS

This application claims priority from U.S. Provisional Patent Application No. 62/660,522, filed on Apr. 20, 2018; the entire contents of which are hereby incorporated by reference.

FIELD

The present invention relates to a connection method for connecting a portion of an extension mechanism to a pivot connector.

BACKGROUND

Vehicles are equipped with one or more closure panels, such as a lift gate, which can be driven between an open position and a closed position using an electric drive system. Hold systems such as counterbalance mechanisms, have been proposed to provide such vehicles with the capability of assisting the operator of the closure panel, in order to maintain a third position hold during opening and closing operations, so as to help counteract the weight of the closure panel itself. Without these hold systems, the closure panel may sag back down at the top end of the operational opening range due to the closure panel weight providing a closure torque greater than an opening torque provided by the electric drive system.

A current disadvantage of hold systems is a bulky form factor, which can take up valuable vehicle cargo space. In order to reduce mass, reduce diameter, and/or increase the available space for complementary functional components (e.g. springs, motors and gearboxes) of the hold system, it is desired to reduce the wall thickness of tubes used on manufacture of the hold systems. However, it is recognized that there is a minimum feasible thickness of the tube walls, in order to maintain strength and integrity of any connections between the tubes and other components of the hold systems.

For example, automotive spindles of current hold systems crimp a metal tube into a groove or pocket of a mating part (typically a ball socket), in order to assemble the metal tube as part of the hold system. For steel tubes, the smallest wall thickness observed using this crimp method is 0.7 mm, and is typically thicker, which facilitates using crimping as a cost-effective and functionally-effective method of attachment for the tube. However, crimping may not be feasible when using relatively thin tube wall thickness, as the strength of a crimp connection can be reduced due to lack of tube material available in the crimp region to resist external loading encountered during operation of the closure panel. One solution is to employ a fine thread between the thin tube and the mating part along with some feature to prevent un-threading. However, threading also requires a minimum wall thickness, therefore threading may not be feasible for relatively thin tube wall thicknesses.

SUMMARY

It is an object of the present invention to provide an extension mechanism to obviate or mitigate at least one of the above presented disadvantages.

A first aspect provided is an extension mechanism for a closure panel of a vehicle, the extension mechanism including: an extension member housed in a body housing, such that the extension member extends and retracts with respect to the body housing as the closure panel is opened and closed; a first connection at one end connected to the extension member for coupling the extension member to one of a body of the vehicle and the closure panel; a second connection at the other end crimp connected to the body housing for coupling the body housing to the other of the closure panel and the body of the vehicle, the body housing having a tube wall, the second connection having an end portion overlapped with the tube wall, the end portion having a receiving indentation receiving a deformed portion of the tube wall forming a crimp connection between the tube wall and the end portion; and a clamping member having a body, at least a portion of the body positioned over the tube wall, such that the deformed portion is sandwiched between the portion of the body and the receiving indentation.

A second aspect provided is an extension mechanism for a closure panel of a vehicle, the extension mechanism including: an extension member housed in a body housing, such that the extension member extends and retracts with respect to the body housing as the closure panel is opened and closed, the extension member having a tube wall; a first pivot connection at one end crimp connected to the extension member for pivotally coupling the extension member to one of a body of the vehicle and the closure panel, the first pivot connection having an end portion overlapped with the tube wall, the end portion having a receiving indentation receiving a deformed portion of the tube wall forming a crimp connection between the tube wall and the end portion; a second pivot connection at the other end connected to the body housing for pivotally coupling the body housing to the other of the closure panel and the body of the vehicle; and a clamping member having a body, at least a portion of the body positioned over the tube wall, such that the deformed portion is sandwiched between the portion of the body and the receiving indentation.

A further aspect provided is a method for constructing an extension mechanism for a closure panel of a vehicle, the extension mechanism including an extension member housed in a body housing, such that the extension member extends and retracts with respect to the body housing as the closure panel is opened and closed, the extension mechanism having a first connection at one end for connecting the extension member to the vehicle and a second connection at the other end for connecting the body housing to the vehicle, the method comprising the steps of: overlapping a tube wall of the body housing with an end portion of the second pivot connection, the end portion having a receiving indentation; receiving a deformed portion of the tube wall into the receiving indentation in order to form a crimp connection between the tube wall and the end portion; and positioning a clamping member having a body by at least a portion of the body over the tube wall, such that the deformed portion is sandwiched between the portion of the body and the receiving indentation.

A fourth aspect provided is a method for constructing an extension mechanism for a closure panel of a vehicle, the extension mechanism including an extension member housed in a body housing, such that the extension member extends and retracts with respect to the body housing as the closure panel is opened and closed, the extension mechanism having a pivot connection at one end for pivotally connecting the extension member to the vehicle and a second pivot connection at the other end for pivotally connecting the body housing to the vehicle, the method comprising the steps of: overlapping a tube wall of the extension member with an end portion of the extension member, the end portion having a receiving indentation; receiving a deformed portion of the tube wall into the receiving indentation in order to form a crimp connection between the tube wall and the end portion; and positioning a clamping member having a body by at least a portion of the body over the tube wall, such that the deformed portion is sandwiched between the portion of the body and the receiving indentation.

BRIEF DESCRIPTION OF THE DRAWINGS

Reference is made, by way of example only, to the attached figures, wherein:

FIG. 3a shows an extended state of the extension mechanism of FIG. 2;

FIG. 3b shows a retracted state of the extension mechanism of FIG. 2;

FIG. 4a shows a cross sectional view of an exploded view of a portion of the extension mechanism of FIG. 2;

FIG. 4b shows a cross sectional view of overlapped components of the extension mechanism of FIG. 2;

FIG. 9 illustrates a second step of an example assembly process of the crimp connection of FIG. 6;

FIG. 10 illustrates a third step of an example assembly process of the crimp connection of FIG. 6;

FIG. 11 illustrates a fourth step of an example assembly process of the crimp connection of FIG. 6;

FIG. 12 illustrates a fifth step of an example assembly process of the crimp connection of FIG. 6;

FIG. 19 is a side view of an electromechanical strut embodiment of the extension mechanism of FIG. 2 constructed in accordance an illustrative embodiment;

FIG. 20 is a side view of the electromechanical strut of FIG. 19 constructed in accordance another aspect of the invention;

FIG. 21 is a side view of the electromechanical strut of FIG. 19 with an outer housing removed therefrom;

DETAILED DESCRIPTION

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments. Likewise, use of a plural form in reference to an item is not intended to exclude the possibility of including one of the item in some embodiments. It will be apparent to one skilled in the art in at least some instances in this specification and the attached claims that it would be possible to include one of the item in at least some embodiments.

Figure 1:
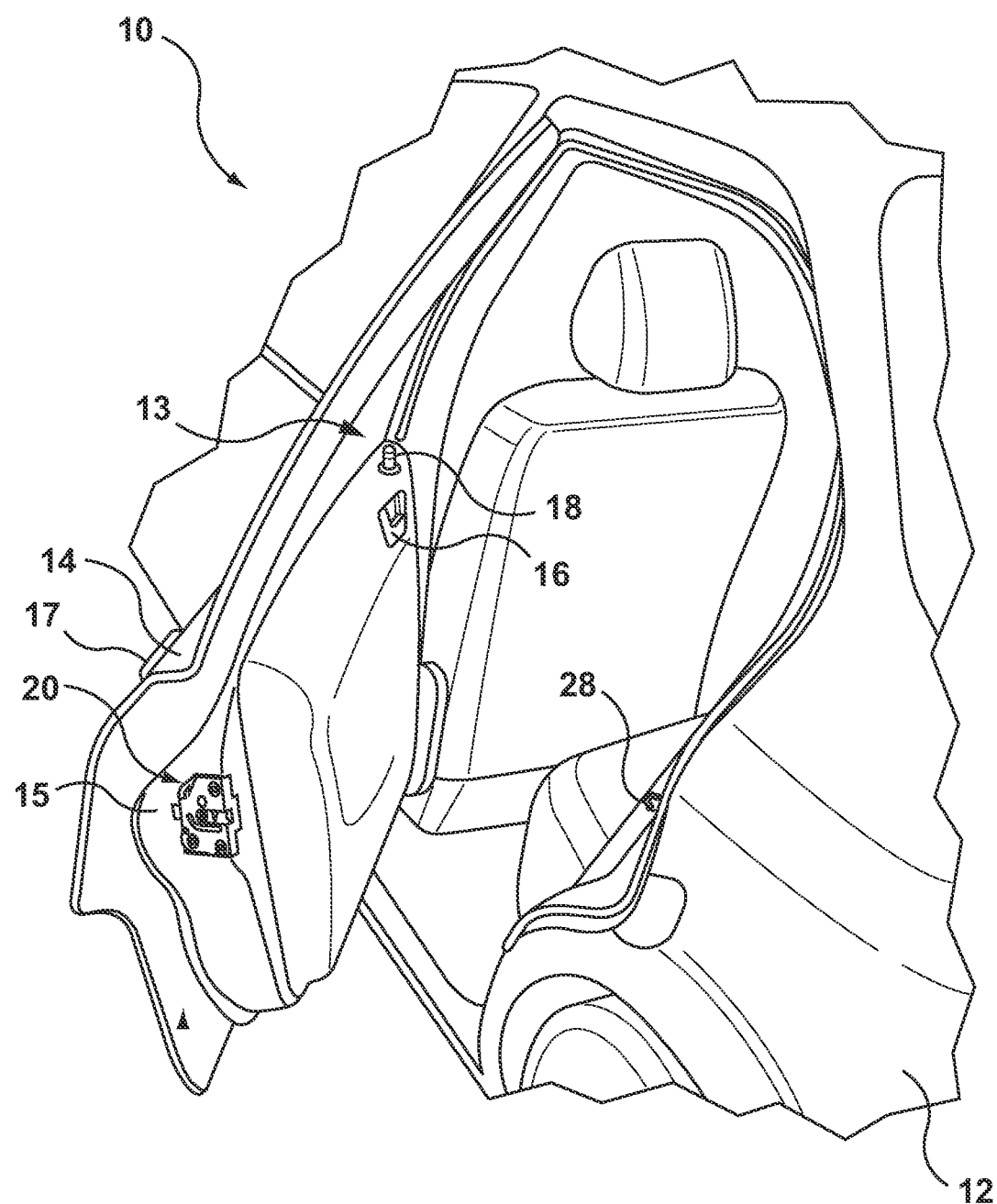
FIG. 1 is perspective view of a vehicle having a closure panel.

FIG. 1 is a perspective view of a vehicle 10 that includes a vehicle body 12 and at least one vehicle door 14 (also referred to as a closure panel 14). The vehicle closure panel 14 includes a latch 20 that is positioned on a frame 15 of the vehicle closure panel 14, the latch 20 being releasably engageable with a striker 28 on the vehicle body 12 to releasably hold the vehicle closure panel 14 in a closed position. The frame 15 can also support a window 13 via a window regulator assembly mounted to the frame 15 of the vehicle closure panel 14. An outside closure panel handle 17 can be provided for opening the latch 20 (i.e. for releasing the latch 20 from the striker 28) to open the vehicle closure panel 14. Further, the vehicle closure panel 14 can have inside controls 16, 18 (e.g. door handle, door locking/unlocking tab, etc.) for operating the latch 20.

Figure 2:
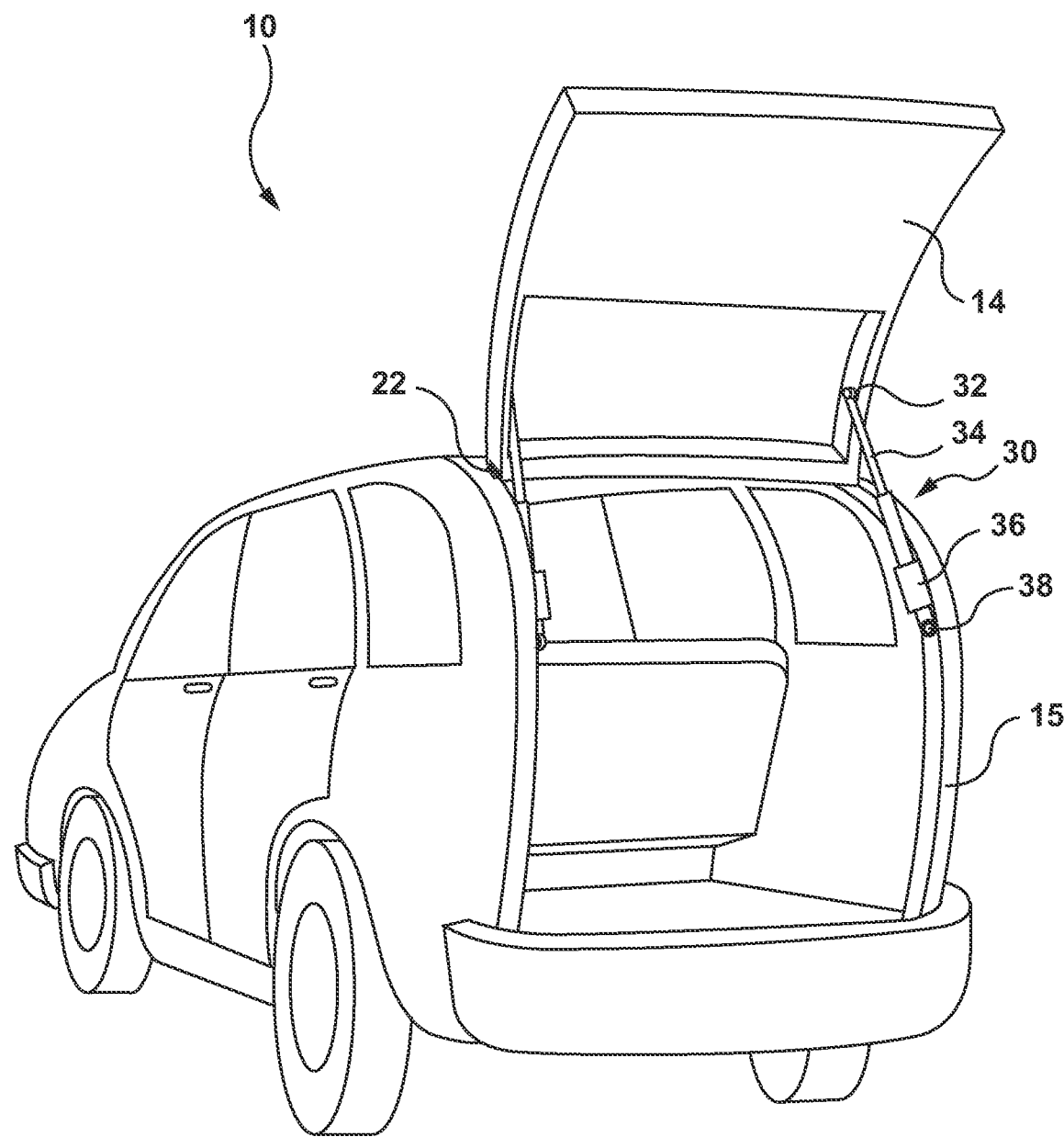
FIG. 2 is further embodiment of the closure panel of FIG. 1.

For vehicles 10, the closure panel 14 can be referred to as a partition or door, typically hinged, but sometimes attached by other mechanisms such as tracks, in front of an opening which is used for entering and exiting the vehicle 10 interior by people and/or cargo. In terms of vehicles 10, the closure panel 14 may be a driver/passenger door, a lift gate (see FIG. 2), or it may be some other kind of closure panel 14, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening in the vehicle body 12 of the vehicle 10. Also contemplated are sliding door embodiments of the closure panel 14 and canopy door embodiments of the closure panel 14, such that sliding doors can be a type of door that open by sliding horizontally or vertically, whereby the door is either mounted on, or suspended from a track that provides for a larger opening. Canopy doors are a type of door that sits on top of the vehicle 10 and lifts up in some way, to provide access for vehicle passengers via the opening (e.g. car canopy, aircraft canopy, etc.). Canopy doors can be connected (e.g. hinged at a defined pivot axis and/or connected for travel along a track) to the vehicle body 12 of the vehicle at the front, side or back of the door, as the application permits. It is recognized that the vehicle body 12 can be represented as a body panel of the vehicle 10, a frame of the vehicle 10, and/or a combination frame and body panel assembly, as desired.

The closure panel 14 (e.g. occupant ingress or egress controlling panels such as but not limited to vehicle doors and lift gates/hatches) can be connected to the vehicle body 12 via one or more hinges 22 (see FIG. 2) and the latch assembly 20 (e.g. for retaining the closure panel 14 in a closed position once closed). It is also recognized the hinge 22 can be configured as a biased hinge 22 that can bias the closure panel 14 towards the open position and/or towards the closed position. Also connecting the closure panel 14 to the frame 15 is an extension mechanism 30 (also referred to as a spindle mechanism or counterbalance mechanism), for example used to provide a counterbalance function during closure panel 14 operation, in order to assist with opening/closing and hold position functions. The extension mechanism 30 has a first connection 32, for example a first pivot connection 32, (e.g. end fitting connection) at one end for connecting the extension mechanism 30 to the closure panel 14 and a second connection 38, for example a second pivot connection 38, (e.g. end fitting connection) for pivotally connecting the extension mechanism 30 to the frame 15. First connection 32 may be a fixed non-pivoting connection while second connection 38 may be a second pivot connection 38, or first connection 32 and second connections 38 may be both pivot connections or fixed connections, or first connection 32 may be a pivot connection while second connection 38 may be a second fixed connection. Typically, the extension mechanism 30 includes an extension member 34 (e.g. an inner tube) housed in a body housing 36 (e.g. also referred to as an outer tube), such that the extension member extends out of (and retracts in to) the body 36 as the closure panel 14 is opened and closed. For example, the extension mechanism 30 can be passively operated (i.e. follows movement of the closure panel 14) and/or actively operated (i.e. mechanically or electrically actuated and thus driving movement of the closure panel). Referring to FIG. 3a, shown is an embodiment of the extension mechanism 30 in an extended state and in FIG. 3b a retracted state.

Figure 5:
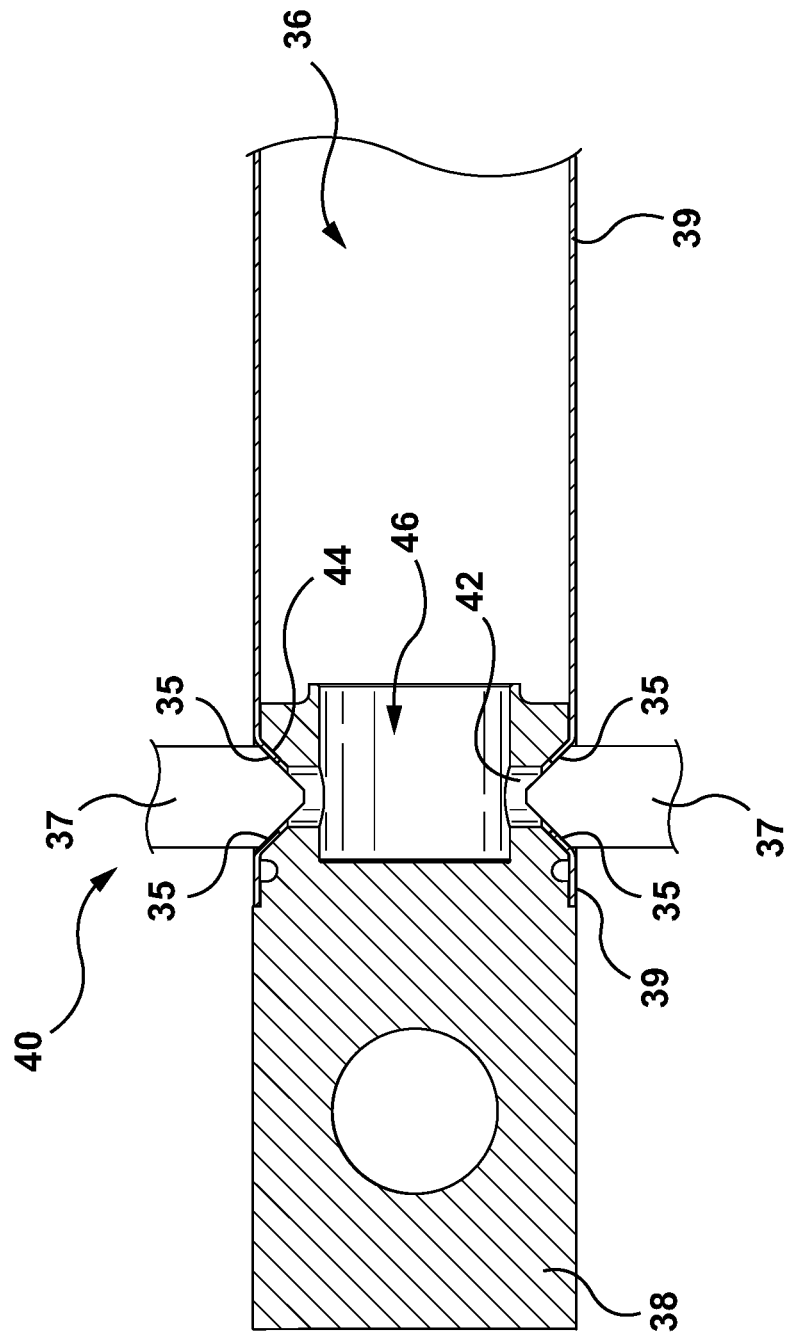
FIG. 5 shows a cross sectional view of an example crimp connection of the extension mechanism of FIG. 2.
Figure 6:
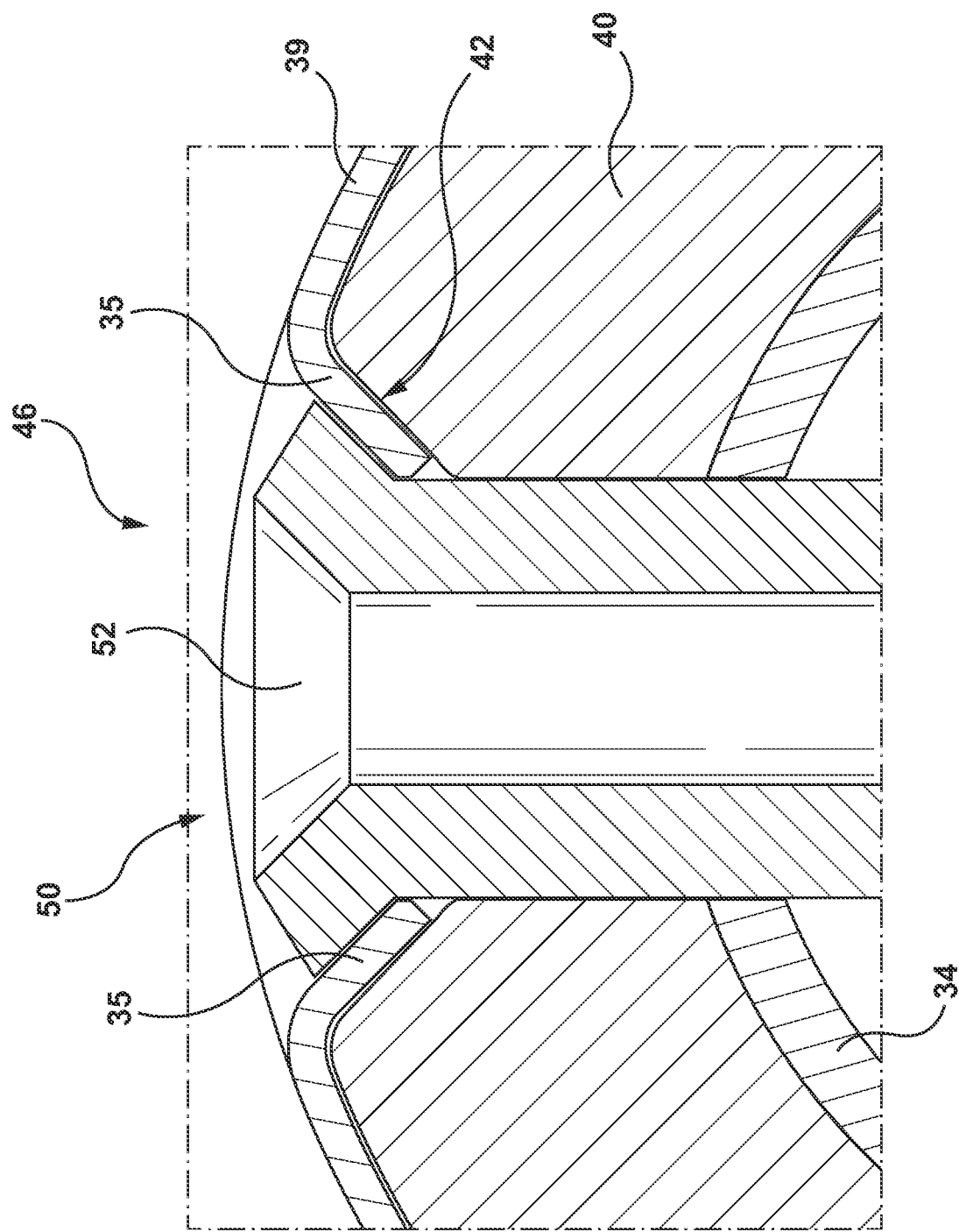
FIG. 6 shows one embodiment of a crimp connection between a tube wall and an end fitting of the extension mechanism of FIG. 2.
Figure 7:
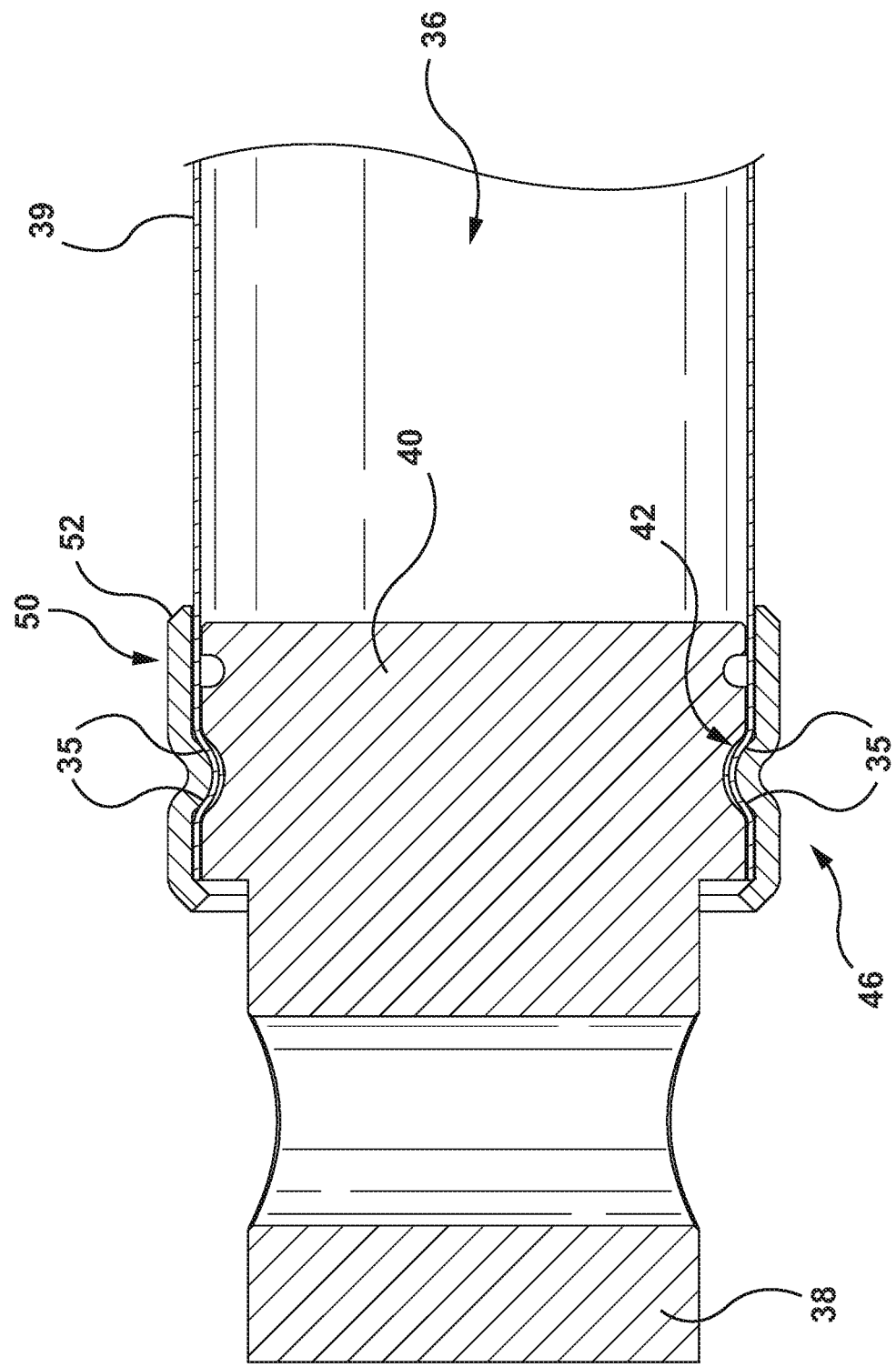
FIG. 7 shows a further embodiment of the crimp connection between the tube wall and the end fitting of the extension mechanism of FIG. 2.

Referring to FIG. 4a, shown is the second pivot connection 38 positioned adjacent to an end of the outer tube 36, hence in an unassembled state. The outer tube 36 has a tube wall 39 of specified thickness dimensioned to fit over or otherwise overlap with an end portion 40 of the second pivot connection 38. FIG. 4b shows the second pivot connection 38 positioned adjacent to the end of the outer tube 36 such that the tube wall 39 overlaps the end portion 40, hence in an assembled state. Noted is that the end portion has a receiving indentation 42 (also referred to as a groove) distributed about all or a portion of the exterior 44 (e.g. circumference) of the end portion 40. As further discussed below, a crimping action (e.g. via crimp tools 37—see FIG. 5) is performed on the tube wall 39 in the vicinity of the receiving indentation 42, in order to deform a wall portion 35 (e.g. deformed wall portion 35) of the tube wall 39 into the receiving indentation 42 and thus facilitate coupling the outer tube 36 to the second pivot connection 38, thereby providing a crimped connection 46 (see FIG. 5) between the outer tube 36 and the second pivot connection 38. Deformed wall portion 50 may assist with spreading external forces between receiving indentation 42 and the tube wall 39. As shown by example, the crimped connection 46 between a (e.g. thin) walled outer tube 36 and the second pivot connection 38 is achieved by the crimp of the tube wall 39 as deformed into the receiving indentation 42 positioned on the exterior 44 of the end portion 40 of the second pivot connection 38. The crimp connection 46 can be enhanced with an additional holding force provided by a clamp member 50 (e.g. pin 50 shown in FIG. 6, ring 50 in FIG. 7, etc.) providing extra material of a body 52 of the clamp member 50 to inhibit separation of the deformed wall portion 35 from the receiving indentation 42 of the end portion 40. The extra material of the body 52 of the clamp member 50 can assist with spreading external forces (exerted on the crimp connection 46 during operation of the extension member 30) over a wider area of the tube wall 39. Thus, the clamp member 50 can help the deformed wall portion 35 to withstand further deformation, which would otherwise result in the deformed wall portion 35 undesirably exiting the receiving indentation 42 (i.e. separation of the crimp connection 46) in the case where the clamp member 50 was absent. As such, the deformed wall portion 35 is sandwiched between receiving indentation 42 and the body 52 of the clamp member 50 once the crimp connection 46 is made between the outer tube 36 when overlapped with the end portion 40 of the second pivot connection 38 (see FIGS. 6 and 7), in order to advantageously supplement the crimp connection 46 (between the tube wall 39 and the end portion 40) with additional strengthening provided by the presence of body 52 of the clamp member 50 in the vicinity of the crimp connection 46. In a similar manner the crimp connection 46 may be made between the extension member 34 when overlapped with an end portion of the first pivot connection 32.

Figure 8:
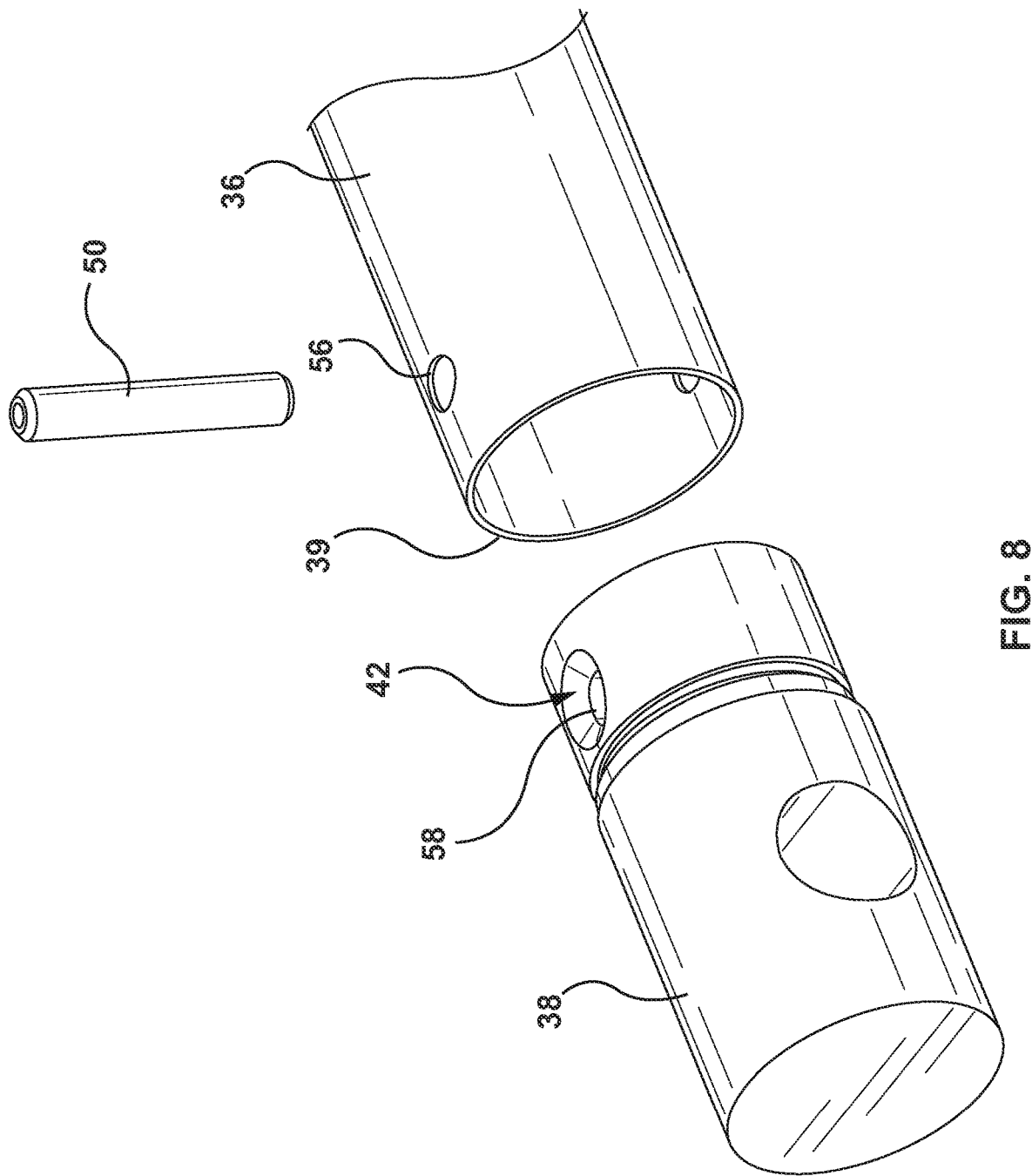
FIG. 8 illustrates a first step of an example assembly process of the crimp connection of FIG. 6.

Referring to FIGS. 8-13, shown is an example assembly process for making the crimp connection 46 between the second pivot connection 38 and the outer tube 36 of the extension mechanism 30 (see FIG. 3a,3b). In FIG. 8, shown is a non-overlapped view of the second pivot connection 38 and the outer tube 36 with the embodiment of the clamp member 50 as the pin 50. The tube wall 39 has one or more holes 56 for aligning with corresponding hole(s) 58 of the receiving indentation 42, such that the holes 56, 58 are configured to receive the pin 50 when inserted there through. In FIG. 9, the tube wall 39 is overlapped with the end portion 40 and the crimping tool 37 is applied in order to deform the deformed portions 35 of the tube wall 39 into the receiving indentation 42. In FIG. 10, the clamp member 50 (e.g. pin) is inserted through the aligned holes 56, 58. In FIG. 11, a tool (e.g. a crimping tool 37) can be used to deform a portion of the body 52 (e.g. head 52 of the pin 50) of the clamping member 50, in order to sandwich the deformed wall portion 35 between the body 52 and the receiving indentation 42. As such, in the present embodiment, the head 52 of the pin 50 is deformed about the holes 56, 58 (see FIG. 10) in order to provide additional strengthening of the crimp connection 46 between the deformed wall portion 35 and the receiving indentation 42. Alternatively, not shown, ends of the pin 50 could be configured with threads in order to receive corresponding nuts and thus sandwich the deformed wall portion 35 between the nuts and the receiving indentation 42. In this case, the nuts would be considered as part of body 52 of the clamp member 50 (e.g. pin 50).

Figure 13:
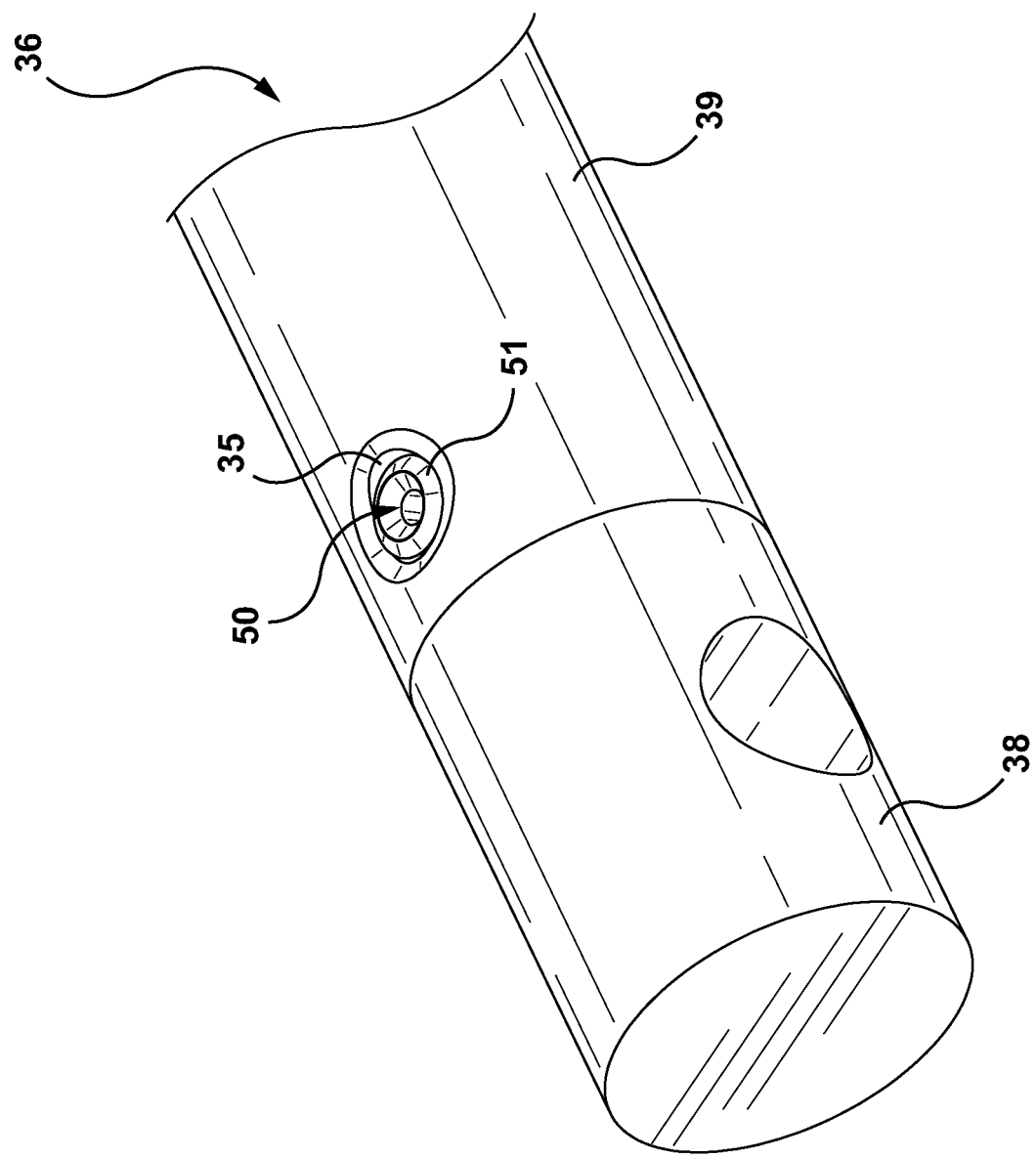
FIG. 13 illustrates a sixth step of an example assembly process of the crimp connection of FIG. 6.

Referring to FIG. 12, shown is an assembled view of the crimp connection 46 in cross section. As such, the end connection fitting 38 has the receiving indentation 42 to receive the deformed wall portion 35 of the tube wall 39, the deformed wall portion 35 being maintained in the receiving indentation 42 the clamping member 50 (e.g. by the head of the pin 50 which extends through the holes 56, 58 (see FIG. 8) in the outer tube 36 and the end portion 40. Advantageously, under load (e.g. applied tension, compression and/or torsional forces between the second pivot connection 38 and the outer tube 36 during operation of the extension mechanism 30—see FIG. 2) further deformation of the deformed wall portion 35 would be resisted by the adjacent portion of the body 52 (e.g. pin head 52) tending to force (e.g. pull) the deformed wall portion 35 into the receiving indentation 42. Hence the pin 50 embodiment of the clamping member 50 can provides a "pulling" or compressive holding force, that is the pin 50 resists pulling apart in order to maintain pulling the flared head of the pin 50 into the receiving indentation 42. Accordingly, as shown in FIG. 13, the swaging process (i.e. the deformation processing of the pin ends 51—e.g. a portion 51—of the body 52 as shown in FIG. 11) causes the pin ends 51 (e.g. a portion 51) to flare out against the deformed portions 35 of the thin tube wall 39 in order to provide (optionally) a profiled surface with the surrounding tube wall 39 to facilitate the connecting portion between the second pivot connection 38 and the outer tube 36 to have the same diameter. For example, as shown in FIG. 12, second pivot connection 38 and the outer tube 36 have the same diameter, with the pin 50 not extending beyond the diameter of outer tube 36.

Figure 14:
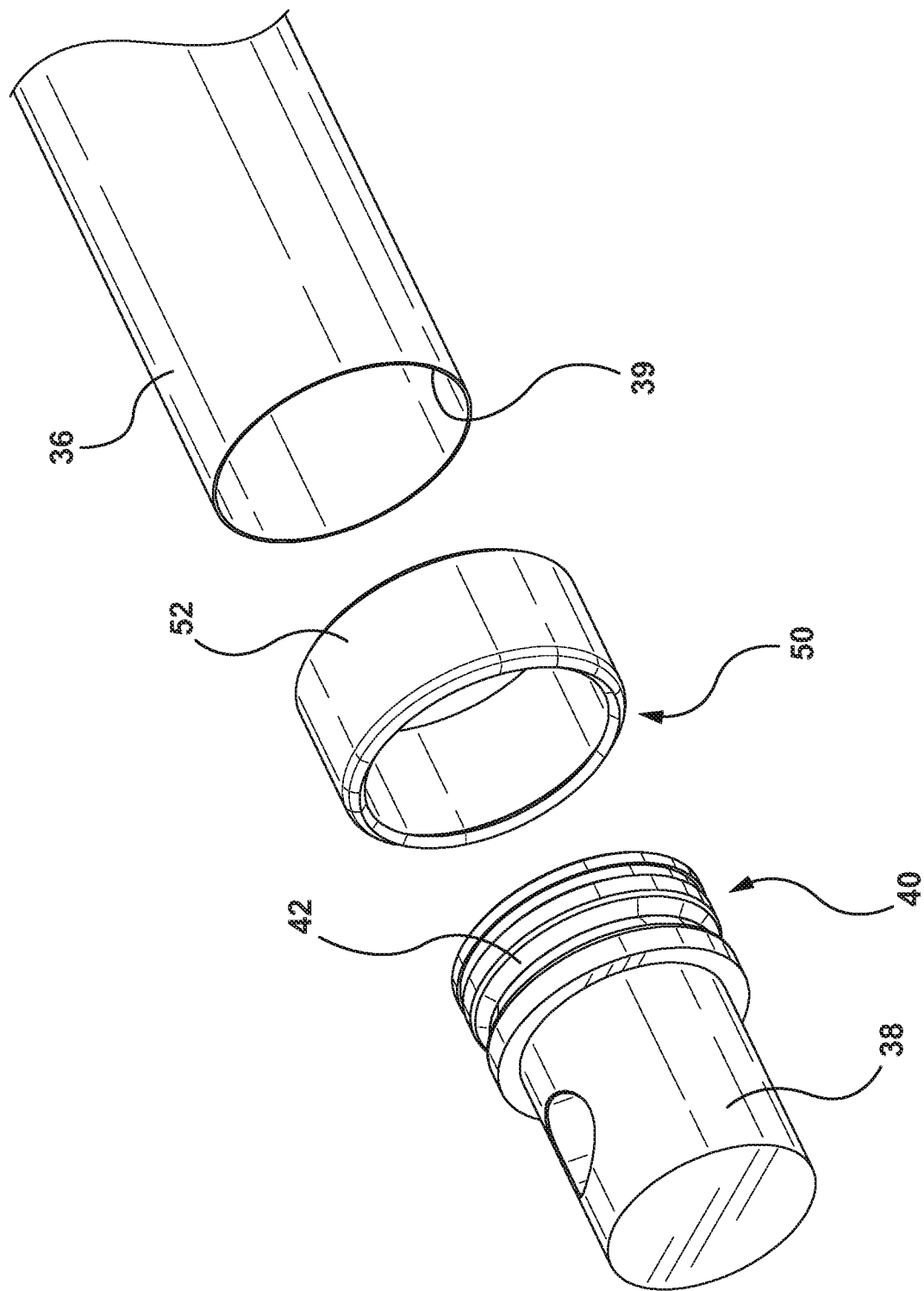
FIG. 14 illustrates a first step of an example assembly process of the crimp connection of FIG. 7.
Figure 16:
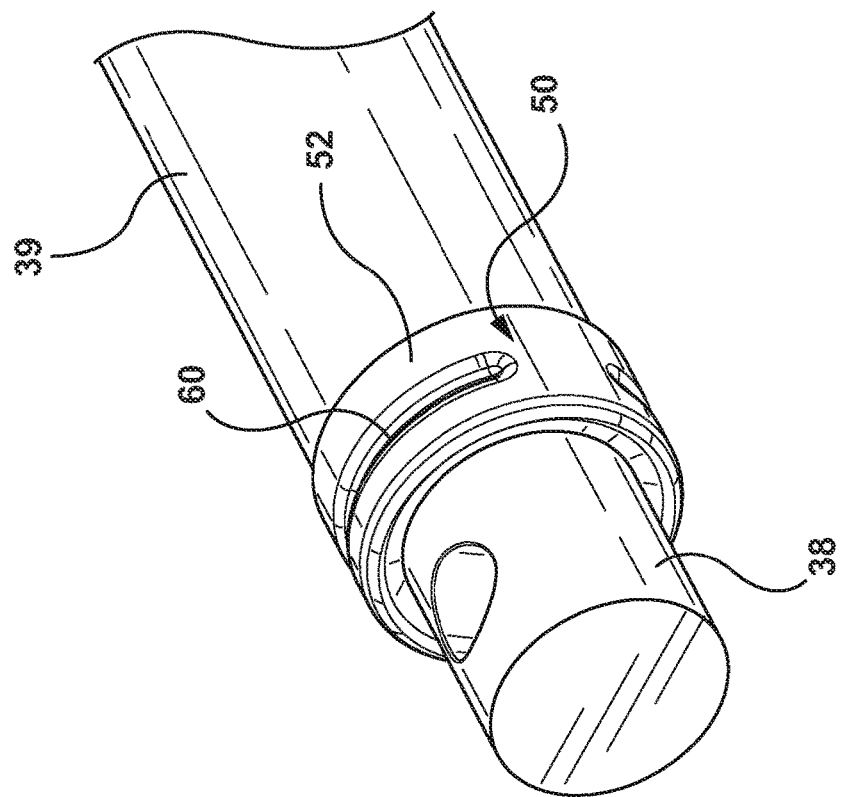
FIG. 16 illustrates a second step of an example assembly process of the crimp connection of FIG. 7.
Figure 15:
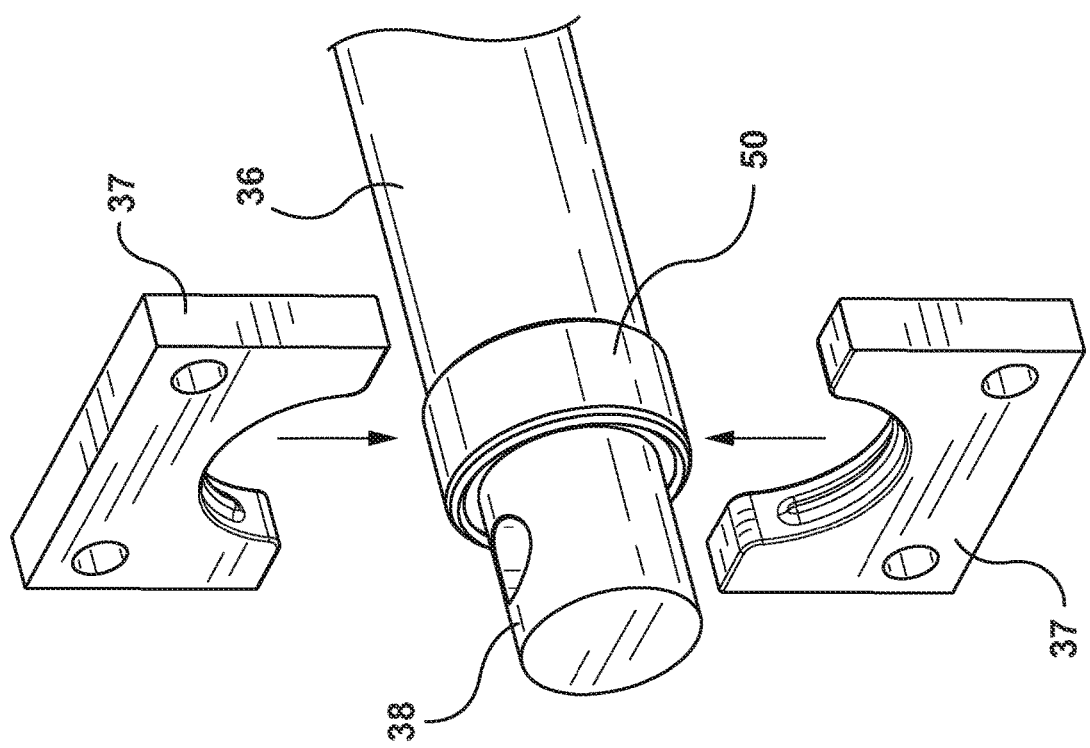
FIG. 15 illustrates a first step of an example assembly process of the crimp connection of FIG. 7.

Referring to FIGS. 14-18, shown is an alternative example assembly process for making the crimp connection 46 between the second pivot connection 38 and the outer tube 36 of the extension mechanism 30 (see FIG. 3a,3b). In FIG. 14, shown is a non-overlapped view of the second pivot connection 38 and the outer tube 36 with the embodiment of the clamp member 50 as the clamping ring 50. The tube wall 39 has an exterior dimension sized to allow the clamping member 50 (e.g. ring 50) to overlap with both the end portion 40 and the outer tube 36 once overlapped themselves (see FIG. 15). In FIG. 15, the outer tube 36 is overlapped with the end portion 40 and the crimping tool 37 (e.g. crimp plate) is applied in order to deform the deformed portions 35 of the tube wall 39 into the receiving indentation 42 (see FIG. 17). It is recognized that as the body 52 of the ring 50 also overlaps the receiving indentation 42 along with the tube wall 39, the body 52 of the ring 50 also experiences a deformed portion segment 60 (e.g. a portion 51), see FIG. 16, as a result of applying the crimping tool 37. As such, the deformed portion segment 60 of the clamping member 50 (e.g. ring 50) sandwiches the deformed wall portion 35 of the tube wall 39 against the receiving indentation 42, see FIG. 17, in order to form and thus reinforce the crimp connection 46. As such, the portion 51 of the body 52 can also be referred to as the deformed portion segment 60 of the body 52.

Optionally, one side 62 adjacent to an end 64 of the outer tube 36 can be flared in order to cover the end 64. Advantageously, the second pivot connection 38 has the receiving indentation 42 (e.g. groove) to receive the deformed wall portion 35 of the tube wall 39, the deformed wall portion 35 being maintained in the receiving indentation 42 by the clamping member 50 (e.g. crimp ring 50). For example, the ring 50 can be thicker than the tube wall 39 to facilitate the deformed wall portion 35 will be maintained in the receiving indentation 42. Since the ring 50 can be thicker than the tube wall 39, the body 52 of the ring 50 can better resist deformation under loading compared the thin material of the tube wall 39. As such, a double layer crimp structure is formed, where the deformed wall portion 35 is pushed into the receiving indentation 42 by the deformed portion segment 60 of the ring 50.

Figure 17:
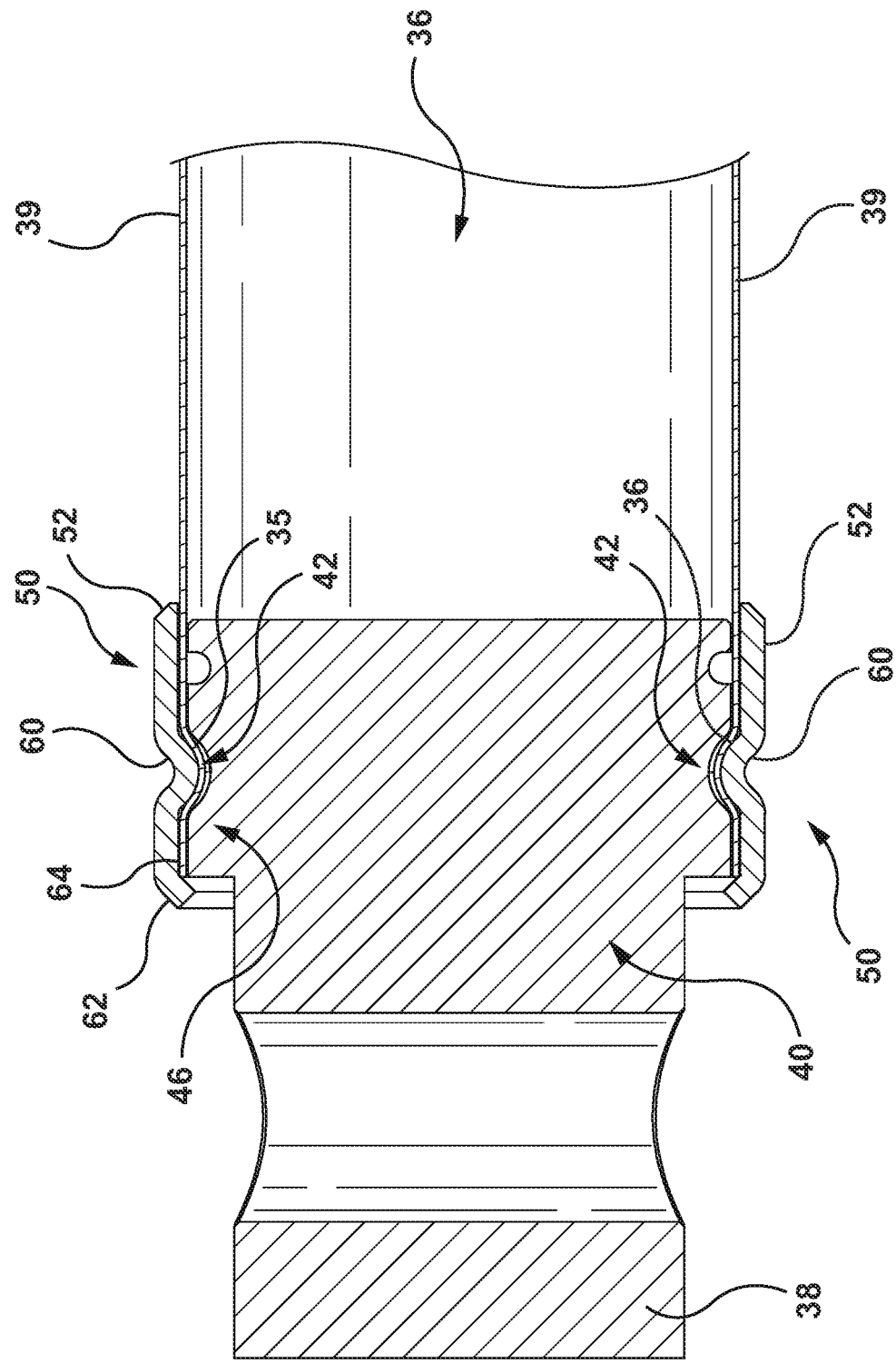
FIG. 17 illustrates a third step of an example assembly process of the crimp connection of FIG. 7.
Figure 18:
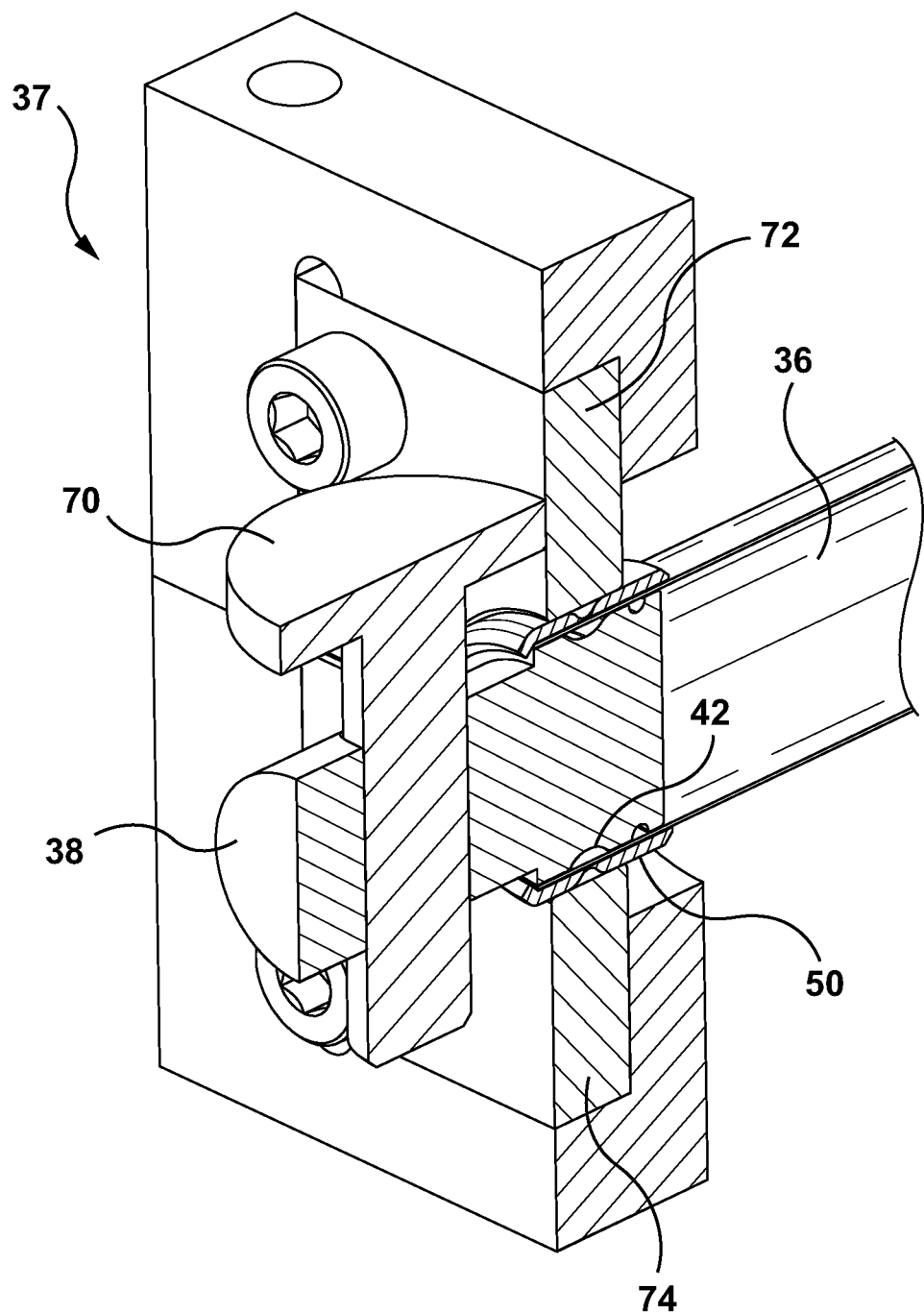
FIG. 18 shows an example crimp tool for performing the crimp connection of FIG. 7.

Referring to FIG. 18, shown is an example configuration of the crimping tool 37 used to form the crimp connection 46 using the clamping member 50 as a ring 50. The crimping tool 37 can include a locating tool 70 to position the second pivot connection 38 with respect to the outer tube 36, a top crimp plate 72 and a bottom crimp plate 74 in order to simultaneously form the deformed portion segment 60 (see FIG. 17) of the clamping member 50 and the deformed wall portion 35 (see FIG. 17) of the outer tube 36 into the receiving indentation 42.

In view of the above, the crimp connection 46 utilizing the clamping member 50 is useful for attaching considered thin-wall tube (e.g. 0.4 mm thick for steel) to a ball socket (or similar end connection fitting 38), while maintaining the target strength of the crimp connection 46. As presented, advantageously the crimping embodiments can facilitate minimizing any damage the visible portion of any coating on the outer tube 36 or otherwise expose the extension mechanism 30 to additional corrosion risks as a consequence of the connection between the outer tube 36 and the second pivot connection 38. Further advantages of the crimp connection 46 can include maintaining sealing between the outer tube 36 and second pivot connection 38, and/or maintaining similar dead-length and packaging as desired.

Now referring to FIGS. 19 to 22, there is an illustrative example of an extension member 30 operable to move the closure panel 14 and hold the closure panel 14 in a third position hold. In this regard, this electromechanical strut 910 as described in US2016/0312514 has a power-operated drive mechanism comprised of a housing, an electric motor, a reduction gear-set driven by the electric motor, a rotatable power screw, a coupling device that is operably disposed between the gearset and the power screw, an extensible member that is linearly translatable relative to the housing. Electromechanical strut 910 includes a power drive unit 912 enveloped in an upper outer housing or tube, referred to hereafter simply as housing 914, and an extensible member, also referred to as telescoping unit 916 provided in an outer lower housing or tube, referred to hereafter simply as extensible tube 918. A first pivot mount 920 (e.g. second pivot connection 38 as shown in FIGS. 3a, 3b), such as a 10 mm ball stud, by way of example and without limitation, fixed to a first end 922 of the strut 910, is pivotally mounted to a portion of the vehicle body 12 (see FIG. 2) adjacent an interior cargo area in the vehicle 10. A second pivot mount 924 (a first pivot connection 32 as shown in FIGS. 3a, 3b), such as a 10 mm ball stud, by way of example and without limitation, fixed to a second end 926 of the strut 910, is pivotally mounted to a lift gate (e.g. closure panel 14—see FIG. 2) of the vehicle 10, by way of example and without limitation.

Figure 22:
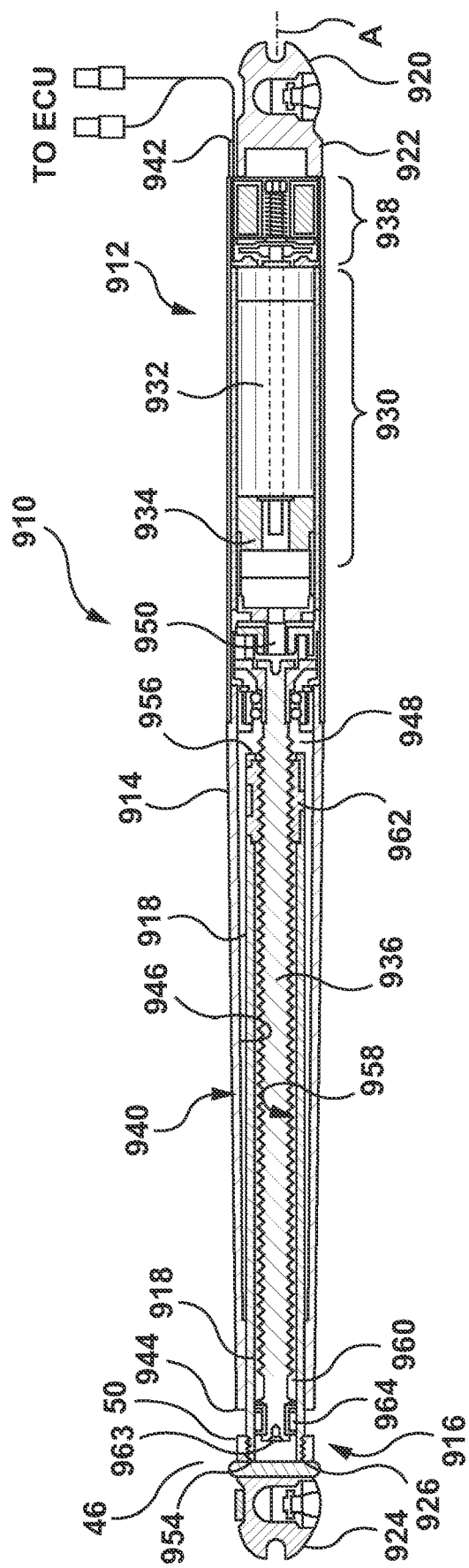
FIG. 22 is a cross-sectional view taken generally along a longitudinal central axis of the electromechanical strut of FIG. 19.

Referring to FIG. 22, the strut 910 includes a motor-gear assembly 930, which includes a motor 932, a gear box, also referred to as planetary gearset 934 and a power screw, also referred to as leadscrew 936. The ability to provide the electromechanical strut 910 with a compact, reduced weight arrangement is provided, at least in part, by an integral electromechanical brake assembly, referred to hereafter simply as brake 938. When the brake 938 is in its normal closed position, also referred to as an "on position" or "engaged state," it provides additional holding force to maintain the power drive unit 912 and telescoping unit 916 in axially fixed or substantially fixed positions relative to one another. In contrast, when the brake 938 is selectively moved to an open position, also referred to as an "off position" or "disengaged state," the telescoping unit 916 is able to move axially relative to the power drive unit 912 to a new axial position, such as to open or close the lift gate 14 or side door 14 of the vehicle 10 (see FIGS. 1, 2), by way of example and without limitation. In general, the electromechanical strut 910, or brake 938 of the strut 910, of the present disclosure can be used in place of, or incorporated with, respectively, the electromechanical struts disclosed in U.S. provisional patent application No. 62/083,419, filed Nov. 24, 2014; U.S. provisional patent application No. 62/109,157, filed Jan. 29, 2015; U.S. provisional patent application No. 62/204,154, filed Aug. 12, 2015; U.S. patent application Ser. No. 14/750, 042, filed Jun. 15, 2015; and U.S. patent application Ser. No. 14/938,156, filed Nov. 11, 2015, which are all incorporated herein by reference in their entirety. The present disclosure can also be incorporated with, respectively, power swing door actuators, for example as disclosed in U.S. patent application Ser. No. 15/910,388, filed Mar. 2, 2018 and in U.S. patent application Ser. No. 16/200,777 filed Nov. 27, 2018, incorporated herein by reference in their entirety.

The electromechanical strut 910 shown in FIGS. 19-22 includes several features, and elimination thereof, which contribute to the improved operation, reduced weight and compact design of the strut 910. In addition to the inclusion of the electromechanical brake 938, which provides additional desired holding force to selectively prevent relative movement between the power drive unit 912 and the telescoping unit 916, the exemplary strut 910 can do away with the need for a counterbalance spring member, such as a coil spring, as is typically deployed within or about a telescoping unit of struts discussed in the background. The elimination of a counterbalance spring can provide the ability to construct the electromechanical strut 910 with a reduced diameter and/or cross-sectional area, thereby allowing the weight of the strut 910 to be reduced, as a result of the minimized package size of the strut 910 and the omission of the material of the counterbalance spring, and the outer envelope to be reduced, thereby facilitating a compact design.

Figure 23:
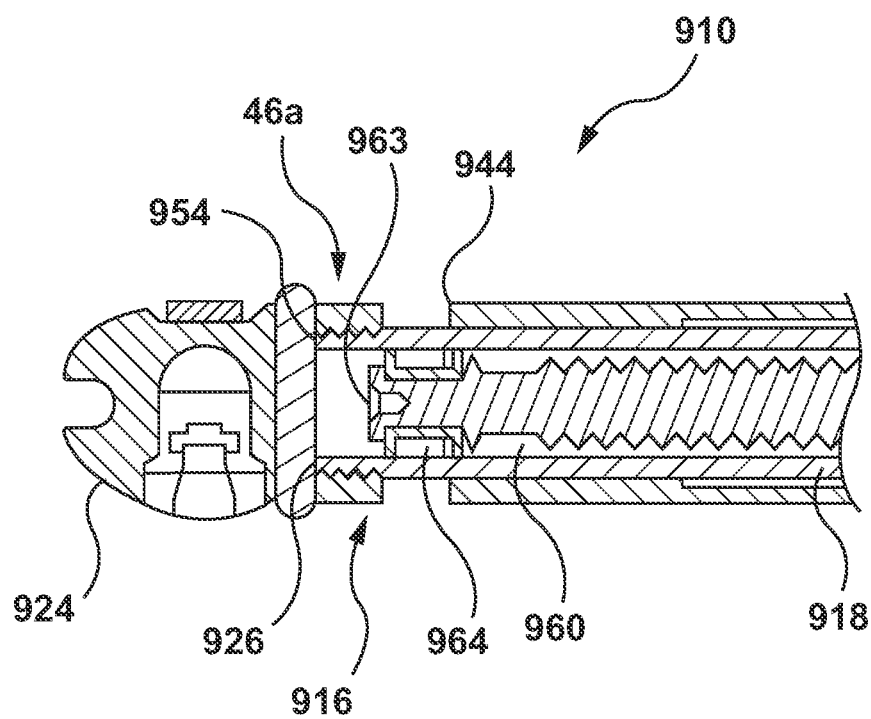
FIG. 23 is a partial cross-sectional view of the electromechanical strut of FIG. 19 illustrating a prior art threaded connection between a tube housing and an end connection fitting.
Figure 24:
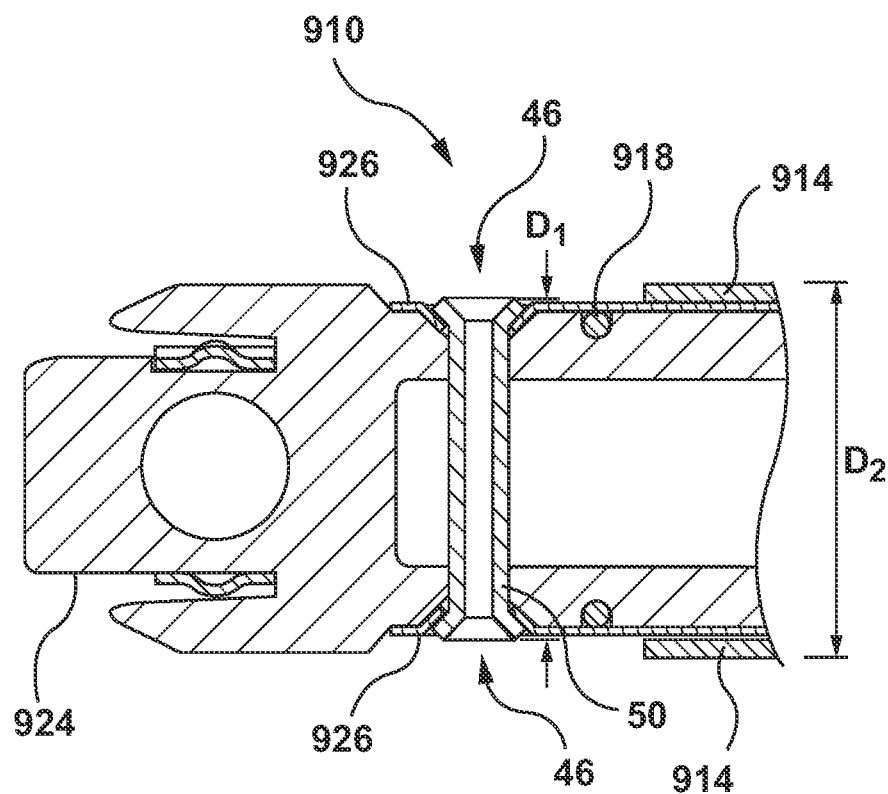
FIG. 24 is a partial cross-sectional view of an extension member in accordance with an illustrative embodiment illustrating the clamp member not exceeding the outer envelope of the surrounding extension member.

Applying the principles of the crimp connection 46 of FIGS. 12, 17 to the strut 910 (of FIGS. 19-22) is shown in FIGS. 22, 24, as a replacement of the prior art connection method of a threaded connection 46*a* shown in FIG. 23. It is recognized that the crimp connection 46 can be applied between the extension member 34 and the first pivot connection 32 and/or the outer tube 36 and the second pivot connection 38. Shown in FIG. 24 is an embodiment of the crimp connection 46 between the second pivot connection 924 (e.g. similar to the first pivot connection 32 of FIGS. 3*a,b*) and the extensible tube 918 (e.g. similar to the extension member 34 of FIG. 3*a,b*).

In combination with the crimp connection 46 applied between the second pivot connection 38 (that is the first pivot mount 920 of the illustrative example in FIG. 22) and the outer tube 36 (that is the housing 914 of the illustrative example in FIG. 22) of the extension mechanism 30 (that is the electromechanical strut 910 of the illustrative example in FIG. 22), the outer envelope can be further reduced. For example the threaded connection 46*a* of the second pivot mount 924 of the strut 910 as shown in FIG. 23 can be replaced with the crimp connection 46 as illustratively shown in FIG. 24. As apparent in FIG. 24, the diameter D1 of the crimp connection 46 does not exceed, or significantly exceed, the diameter D2 of housing 914 (e.g. the outer tube 36 of FIG. 3*a*,3*b*), and thus the overall envelope can be reduced.

As shown in FIGS. 19 and 22, the outer housing 914 has a tubular wall with an outer surface 940 that extends along a longitudinal axis A between the opposing first and second ends 942, 944 and an inner surface 946 bounding a cavity or chamber 948 sized for at least partial receipt of the motor-gear assembly 930 therein. The motor 932 and planetary gearset 934 are seated within the chamber 948. The lead screw 936 is disposed within the telescoping unit 916 and couples to an output shaft 950 of the power drive unit 912. In the illustrated embodiment, the planetary gearset 934, which is known in the art per se, provides about a 20:1 gear ratio reduction, by way of example and without limitation. The planetary gearset 934 can be provided as described in any of the aforementioned references incorporated herein by reference, and can be provided having any desired gear ratio reduction. The power drive unit 912 features a coupling 952 that enables the power drive unit 912 to be quickly and easily attached with the telescoping unit 916 between the first and second ends 942, 944 of the outer housing 914.

In the first example embodiment, the tubular wall of the outer housing 914 includes a pair of cylindrically-shaped tubes joined together, though, as shown in FIG. 20, showing an electromechanical strut 910' constructed in accordance with another aspect of the invention, it is to be recognized a tubular wall of the housing 914' can be provided as a single tubular member, if desired, with all else being the same or substantially the same. The motor 932 and the gearset 934 are located along the axis A between the leadscrew 936 and the electromechanical brake assembly 938, such that the brake assembly 938 is disposed between the motor 932 and the first end 942 of the housing 914, and the motor 932 is disposed between the gearset 934 and the electromechanical brake assembly 938. Alternatively, the electromechanical brake assembly 938 could be mounted on the opposite side of the motor 932 and gearset 934, if desired, as would be recognized by one skilled in the art upon viewing the disclosure herein. The telescoping unit 916 includes the (e.g. single-walled) extensible tube 918 that extends along the longitudinal axis A between opposing tube wall first and second ends 954, 956 and has an inner surface 958 bounding a cavity or chamber 960 sized for clearance receipt of the leadscrew 936. One end 954 of extensible tube 918 is rigidly connected to the second pivot mount 924, such as via mating helical threads as a threaded connection 46*a* for interconnecting the parts, by way of example and without limitation (see FIG. 23) or by a crimp connection 46 (see FIGS. 22, 24).

The extensible tube 918 can have a drive nut 962 fixedly mounted in its chamber 960 adjacent the second end 956 thereof, such as via press fit and/or bonded fixation therein or riveted connection, by way of example and without limitation. The drive nut 962 can be threadedly coupled with the leadscrew 936 in order to convert rotational movement of the leadscrew 936 into linear motion of the telescoping unit 916 along the longitudinal central axis A of the strut 910. To facilitate guiding the telescoping unit 916 is generally concentric relation with the housing 914 along the axis A, an annular, low (e.g. friction) wear sleeve 964 can be fixed adjacent an end 963 of the leadscrew 936 via any suitable fixation mechanism. The wear sleeve 964 remains axially fixed in relation to the leadscrew 936 and facilitates guiding smooth axial movement of the extensible tube 918 as it translates axially in response to axial movement of the drive nut 962 along the external male threads of the leadscrew 936.

Figure 25:
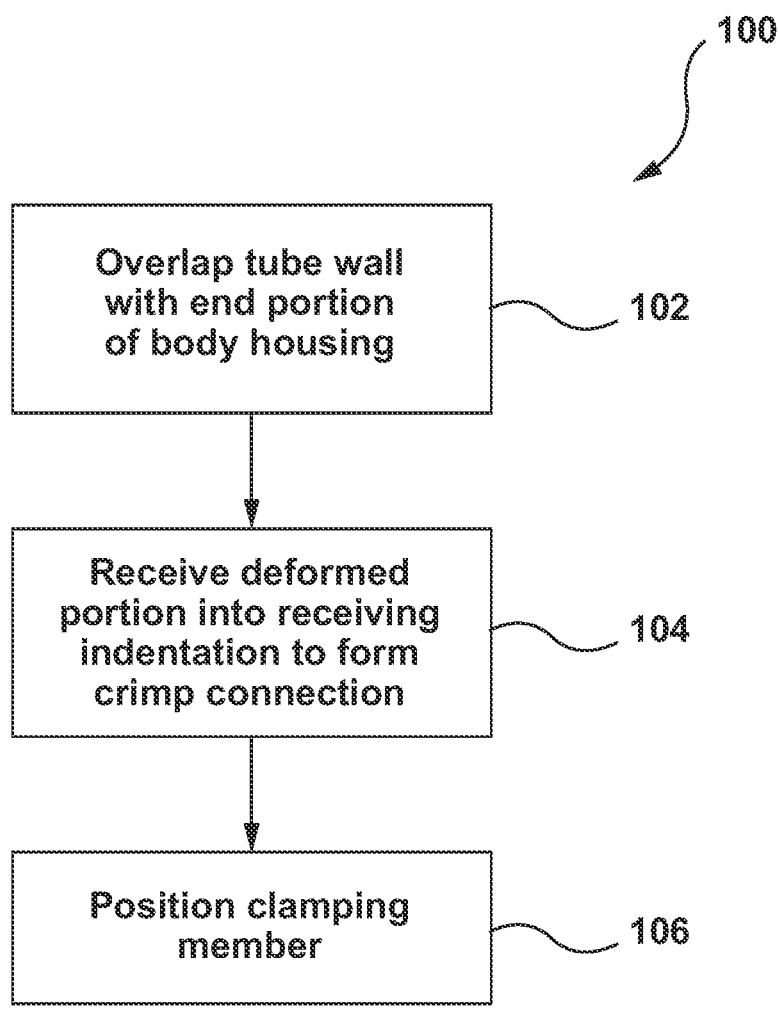
FIG. 25 is an example method of forming the crimp connection of FIG. 13 or 17.

Referring to FIGS. 4*a,b*-13 and FIG. 25, shown is a method 100 for constructing an extension mechanism 30 for a closure panel 14 of a vehicle 10, the extension mechanism 30 including an extension member 34 housed in a body housing 36, such that the extension member 30 extends and retracts with respect to the body housing 36 as the closure panel 14 is opened and closed, the extension mechanism 30 having a first pivot connection 32 at one end for connecting the extension member 34 to the vehicle 10 (e.g. at the closure panel 14) and a second pivot connection 38 at the other end for pivotally connecting the body housing 36 to the vehicle 10 (e.g. to a body 12 of the vehicle 10). The method comprises the steps of: step 102 is overlapping a tube wall 39 of the body housing 36 with an end portion 40 of the body housing 36, the end portion 40 having a receiving indentation 42. Step 104 is receiving a deformed portion 35 of the tube wall 39 into the receiving indentation 42 in order to form a crimp connection 46 between the tube wall 39 and the end portion 40. Step 106 is positioning a clamping member 50 (e.g. a pin or sleeve) having a body 52 by at least a portion 51 of the body 52 over the tube wall 39, such that the deformed portion 35 is sandwiched between the portion 51 of the body 52 and the receiving indentation 42.

Referring to FIGS. 14-17 and FIG. 26, shown is a method 200 for constructing an extension mechanism 30 for a closure panel 14 of a vehicle 10, the extension mechanism 30 including an extension member 34 housed in a body housing 36, such that the extension member 30 extends and retracts with respect to the body housing 36 as the closure panel 14 is opened and closed, the extension mechanism 30 having a first pivot connection 32 at one end for connecting the extension member 34 to the vehicle 10 (e.g. to the closure panel 14) and a second pivot connection 38 at the other end for pivotally connecting the body housing 36 to the vehicle 10 (e.g. to a body 12 of the vehicle 10). The method comprises the steps of: step 202 is overlapping a tube wall 39 of the extension member 34 with an end portion 40 of the extension member 34, the end portion 40 having a receiving indentation 42. Step 204 is receiving a deformed portion 35 of the tube wall 39 into the receiving indentation 42 in order to form a crimp connection 46 between the tube wall 39 and the end portion 40. Step 206 is positioning a clamping member 50 (e.g. a pin, a sleeve or ring) having a body 52 by at least a portion 51 of the body 52 over the tube wall 39, such that the deformed portion 35 is sandwiched between the portion 51 of the body 52 and the receiving indentation 42.

Figure 26:
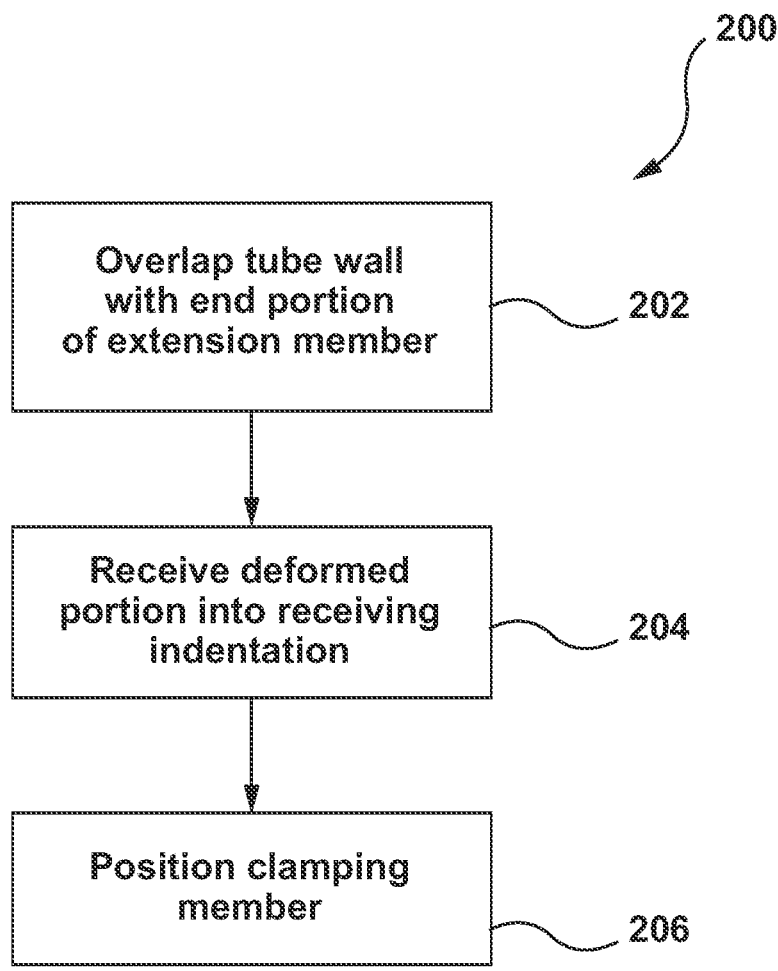
FIG. 26 is an example method of forming the crimp connection of FIG. 22 or 24.

Referring to FIGS. 25 and 26, it is also recognized that the extension mechanism 30 could also have a pair of crimp connections 46, such that the second pivot connection 38 is connected to the wall 39 of the body housing 36 by the crimp connection 46 (see FIGS. 13, 17 by example) and the first pivot connection 32 is connected to the wall 39 of the extension member 34 by another crimp connection 46 (see FIGS. 22, 24 by example).

We claim:

1. An extension mechanism (30) for a closure panel (14) of a vehicle (10), the extension mechanism including:
    an extension member (34) housed in a housing (36), such that the extension member extends and retracts with respect to the housing as the closure panel is opened and closed;
    a first connection (32) at one end connected to the extension member for coupling the extension member to one of a body (12) of the vehicle and the closure panel;
    a second connection (38) at the other end crimp connected to the housing for coupling the housing to the other of the closure panel and the body of the vehicle, the housing having a tube wall (39), the second connection having an end portion (40) overlapped with the tube wall, the end portion having a receiving indentation (42) receiving a deformed portion (35) of the tube wall forming a crimp connection (46) between the tube wall and the end portion; and
    a clamping member (50) having a member body (52), at least a member portion (51) of the member body positioned over the tube wall, such that the deformed portion is sandwiched between the member portion of the member body and the receiving indentation;
    wherein the clamping member is a pin positioned through a hole (56) of the tube wall aligned with a hole (58) of the end portion.

2. An extension mechanism (30) for a closure panel (14) of a vehicle (10), the extension mechanism including:
    an extension member (34) housed in a housing (36), such that the extension member extends and retracts with respect to the housing as the closure panel is opened and closed;
    a first connection (32) at one end connected to the extension member for coupling the extension member to one of a body (12) of the vehicle and the closure panel;
    a second connection (38) at the other end crimp connected to the housing for coupling the housing to the other of the closure panel and the body of the vehicle, the housing having a tube wall (39), the second connection having an end portion (40) overlapped with the tube wall, the end portion having a receiving indentation (42) receiving a deformed portion (35) of the tube wall forming a crimp connection (46) between the tube wall and the end portion; and
    a clamping member (50) having a member body (52), at least a member portion (51) of the member body positioned over the tube wall, such that the deformed portion is sandwiched between the member portion of the member body and the receiving indentation;
    wherein the member portion of the member body is deformed adjacent to the deformed portion of the tube wall and the clamping member is a pin and the member portion is a pin end.

3. The extension mechanism of claim 1, further comprising a lead screw (936) coupled to one end (956) of the extension member in order to drive the extension member into and out of a cavity (948) of the housing during operation of the extension mechanism.

4. The extension mechanism of claim 3, further comprising a drive unit (912) coupled to the lead screw in order to rotate the lead screw during operation of the extension mechanism.

5. The extension mechanism of claim 1, wherein the first connection connects the extension member to the closure panel and the second connection connects the housing to the body of the vehicle.

6. The extension mechanism of claim 1, wherein the first connection connects the extension member to the body of the vehicle and the second connection connects the housing to the closure panel.

7. An extension mechanism (30) for a closure panel (14) of a vehicle (10), the extension mechanism including:
    an extension member (34) housed in a housing (36), such that the extension member extends and retracts with respect to the housing as the closure panel is opened and closed, the housing having a tube wall (39);
    a first pivot connection (32) at one end crimp connected to the extension member for pivotally coupling the extension member to one of a body (12) of the vehicle and the closure panel, the first pivot connection having an end portion (40) overlapped with the tube wall, the end portion having a receiving indentation (42) receiving a deformed portion (35) of the tube wall forming a crimp connection (46) between the tube wall and the end portion;

a second pivot connection (38) at the other end connected to the housing for pivotally coupling the housing to the other of the closure panel and the body of the vehicle; and a clamping member (50) having a member body (52), at least a member portion (51) of the member body positioned over the tube wall, such that the deformed portion is sandwiched between the member portion of the member body and the receiving indentation;

wherein the clamping member is a pin positioned through a hole (56) of the tube wall aligned with a hole (58) of the end portion.

8. An extension mechanism (30) for a closure panel (14) of a vehicle (10), the extension mechanism including:

an extension member (34) housed in a housing (36), such that the extension member extends and retracts with respect to the housing as the closure panel is opened and closed, the housing having a tube wall (39);

a first pivot connection (32) at one end crimp connected to the extension member for pivotally coupling the extension member to one of a body (12) of the vehicle and the closure panel, the first pivot connection having an end portion (40) overlapped with the tube wall, the end portion having a receiving indentation (42) receiving a deformed portion (35) of the tube wall forming a crimp connection (46) between the tube wall and the end portion;

a second pivot connection (38) at the other end connected to the housing for pivotally coupling the housing to the other of the closure panel and the body of the vehicle; and a clamping member (50) having a member body (52), at least a member portion (51) of the member body positioned over the tube wall, such that the deformed portion is sandwiched between the member portion of the member body and the receiving indentation, wherein the member portion of the member body is deformed adjacent to the deformed portion of the tube wall and the clamping member is a pin and the member portion is a pin end.

9. The extension mechanism of claim 7 further comprising a lead screw (936) coupled to one end (956) of the extension member in order to drive the extension member into and out of a cavity (948) of the housing during operation of the extension mechanism.

10. The extension mechanism of claim 9 further comprising a drive unit (912) coupled to the lead screw in order to rotate the lead screw during operation of the extension mechanism.

11. The extension mechanism of claim 7, wherein the first pivot connection connects the extension member to the closure panel and the second pivot connection connects the housing to the body of the vehicle.

12. The extension mechanism of claim 7, wherein the first pivot connection connects the extension member to the body of the vehicle and the second pivot connection connects the housing to the closure panel.

13. A method for constructing an extension mechanism (30) for a closure panel (14) of a vehicle (10), the extension mechanism including an extension member (34) housed in a housing (36), such that the extension member extends and retracts with respect to the housing as the closure panel is opened and closed, the extension mechanism having a pivot connection (32) at one end for pivotally connecting the extension member to the vehicle and a pivot second connection (38) at the other end for pivotally connecting the housing to the vehicle, the method comprising the steps of:

overlapping a tube wall (39) with an end portion (40) of the extension member, the end portion having a receiving indentation (42);

receiving a deformed portion (35) of the tube wall into the receiving indentation in order to form a crimp connection (46) between the tube wall and the end portion; and positioning a clamping member (50) having a member body (52) by at least a member portion (51) of the member body over the tube wall, such that the deformed portion is sandwiched between the member portion of the member body and the receiving indentation;

wherein the clamping member is a pin positioned through a hole (56) of the tube wall aligned with a hole (58) of the end portion.

14. A method for constructing an extension mechanism (30) for a closure panel (14) of a vehicle (10), the extension mechanism including an extension member (34) housed in a housing (36), such that the extension member extends and retracts with respect to the housing as the closure panel is opened and closed, the extension mechanism having a pivot connection (32) at one end for pivotally connecting the extension member to the vehicle and a pivot second connection (38) at the other end for pivotally connecting the housing to the vehicle, the method comprising the steps of:

overlapping a tube wall (39) with an end portion (40) of the extension member, the end portion having a receiving indentation (42);

receiving a deformed portion (35) of the tube wall into the receiving indentation in order to form a crimp connection (46) between the tube wall and the end portion; and positioning a clamping member (50) having a member body (52) by at least a member portion (51) of the member body over the tube wall, such that the deformed portion is sandwiched between the member portion of the member body and the receiving indentation, wherein the member portion of the member body is deformed adjacent to the deformed portion of the tube wall and the clamping member is a pin and the member portion is a pin end.

\* \* \* \* \*